US012415538B2

(12) United States Patent
Ziebart et al.

(10) Patent No.: US 12,415,538 B2
(45) Date of Patent: Sep. 16, 2025

(54) SYSTEMS AND METHODS FOR PARETO DOMINATION-BASED LEARNING

(71) Applicant: Aurora Operations, Inc., Mountain View, CA (US)

(72) Inventors: Brian D. Ziebart, Chicago, IL (US); Paul Vernaza, Cupertino, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 193 days.

(21) Appl. No.: 17/576,553

(22) Filed: Jan. 14, 2022

(65) Prior Publication Data
US 2023/0227061 A1 Jul. 20, 2023

(51) Int. Cl.
*B60W 60/00* (2020.01)
*B60W 50/00* (2006.01)
*G05B 13/02* (2006.01)

(52) U.S. Cl.
CPC .......... *B60W 60/001* (2020.02); *B60W 50/00* (2013.01); *G05B 13/0265* (2013.01); *B60W 2050/0022* (2013.01)

(58) Field of Classification Search
CPC .............. B60W 60/001; B60W 50/00; B60W 2050/0022; B60W 10/22; B60W 50/06; B60W 2552/00; G05B 13/0265; G05B 13/027; G05B 13/042; G05D 1/0088; G06N 3/04; G06N 3/08; B60G 2600/1878; B60G 17/018
USPC .......... 701/25, 27, 40, 59, 481, 524; 706/13, 706/15, 43, 23; 703/4, 93; 700/48
See application file for complete search history.

(56) References Cited

U.S. PATENT DOCUMENTS

| 2006/0178824 | A1 | 8/2006 | Ibrahim | |
| 2010/0106603 | A1* | 4/2010 | Dey | G08G 1/096811 |
| 2017/0168485 | A1* | 6/2017 | Berntorp | G01C 21/26 |

(Continued)

FOREIGN PATENT DOCUMENTS

| DE | 102019216232 A1 * | 4/2021 | ........ B60W 60/0011 |
| KR | 102223347 | 3/2021 | |

OTHER PUBLICATIONS

International Search Report and Written Opinion for Application No. PCT/US2023/010167, mailed May 1, 2023, 7 pages.

(Continued)

*Primary Examiner* — Ramon A. Mercado
*Assistant Examiner* — Ellis B. Ramirez
(74) *Attorney, Agent, or Firm* — Dority & Manning, P.A.

(57) ABSTRACT

Techniques for improving the performance of an autonomous vehicle (AV) are described herein. A system can determine a plan for the AV in a driving scenario that optimizes an initial cost function of a control algorithm of the AV. The system can obtain data describing an observed human driving path in the driving scenario. Additionally, the system can determine for each cost dimension in the plurality of cost dimensions, a quantity that compares the estimated cost to the observed cost of the observed human driving path. Moreover, the system can determine a function of a sum of the quantities determined for each cost dimension in the plurality of cost dimensions. Subsequently, the system can use an optimization algorithm to adjust one or more weights of the plurality of weights applied to the plurality of cost dimensions to optimize the function of the sum of the quantities.

16 Claims, 12 Drawing Sheets

(56) References Cited

U.S. PATENT DOCUMENTS

| | | | | |
|---|---|---|---|---|
| 2019/0180115 | A1* | 6/2019 | Zou | G06N 3/08 |
| 2019/0196419 | A1* | 6/2019 | Wee | G06N 20/20 |
| 2020/0139959 | A1* | 5/2020 | Akella | B60W 60/0015 |
| 2020/0159225 | A1* | 5/2020 | Zeng | G05D 1/0212 |
| 2020/0216094 | A1* | 7/2020 | Zhu | B60W 60/0013 |
| 2021/0020045 | A1* | 1/2021 | Huang | G01C 21/3804 |
| 2021/0200212 | A1 | 7/2021 | Urtasun et al. | |
| 2021/0264287 | A1* | 8/2021 | Gardner | G06N 20/20 |
| 2021/0291862 | A1* | 9/2021 | Jiang | B60W 60/001 |
| 2021/0403034 | A1 | 12/2021 | Lapin et al. | |
| 2021/0403045 | A1 | 12/2021 | Lin et al. | |
| 2022/0048187 | A1* | 2/2022 | Rudenko | G05D 1/0214 |

OTHER PUBLICATIONS

Abbeel et al, "Apprenticeship Learning via Inverse Reinforcement Learning", Conference on Machine Learning, Jul. 4-8, 2004, Banff Alberta, Canada, 8 pages.

Brown et al, "Extrapolating Beyond Suboptimal Demonstrations via Inverse Reinforcement Learning from Observations", International Conference on Machine Learning, Jun. 10-15, 2019, Long Beach, California, United States, 10 pages.

Crammer et al, "On the Algorithmic Implementation of Multiclass Kernel-Based Vector Machines", Journal of Machine Learning Research, vol. 2, Dec. 2001, pp. 265-292.

Doerr et al, "Direct Loss Minimization Inverse Optimal Control", In Robotics: Science and Systems, 2015, 9 pages.

Liu, "Fisher Consistency of Multicategory Support Vector Machines", Artificial Intelligence and Statistics, 8 pages.

Ng et al, "Algorithms for Inverse Reinforcement Learning" International Conference on Machine Learning, Jun. 29-Jul. 2, 2000, Stanford, California, United States, 8 pages, 2000.

Ratliff et al, "Maximum Margin Planning", International Conference on Machine Learning, Jun. 25-29, 2006, Pittsburgh, Pennsylvania, United States, 8 pages.

Syed et al, "A Game-Theoretic Approach to Apprenticeship Learning", Conference on Neural Information Processing Systems, Dec. 8-10, 2008, British Columbia, Canada, 8 pages.

Taskar et al, "Max-Margin Markov Networks", Conference on Neural Information Processing Systems, Dec. 8-13, 2003, Vancouver, Canada. 8 pages.

Tsochantaridis et al, "Support Vector Machine Learning for Interdependent and Structured Output Spaces", International Conference on Machine Learning, Aug. 21-24, 2003, Washington, District of Columbia, United States, 8 pages.

Vapnik et al, "Bounds on Error Expectation for Support Vector Machines", Neural Computation, vol. 12 No. 9, 2000, pp. 2013-2036.

Ziebart et al, "Maximum Entropy Inverse Reinforcement Learning", National Conference on Artificial Intelligence, Jul. 13-17, 2008, Chicago, Illinois, United States, pp. 1433-1438.

Ziebart et al, "Probabilistic Pointing Target Prediction via Inverse Optimal Control", International Conference on Intelligent User Interfaces, Feb. 14-17, 2012, Lisbon, Portugal, 10 pages.

* cited by examiner

SYSTEMS AND METHODS FOR PARETO DOMINATION-BASED LEARNING

BACKGROUND

The present disclosure relates generally to machine-learning techniques for controlling robotic platforms such as autonomous vehicles (AVs). In particular, the present disclosure relates to machine-learned models for determining a plan for an AV in a driving scenario that optimizes an initial cost function of a control algorithm of the AV.

AVs may rely on machine-learned models to determine a motion plan for different driving scenarios. The effective operation and motion of an AV may depend on optimized motion determination provided by the machine-learned models. Better machine-learned training techniques may be needed to improve motion determination for AVs.

SUMMARY

Aspects and advantages of embodiments of the present disclosure will be set forth in part in the following description, or may be learned from the description, or may be learned through practice of the embodiments.

Learning from human demonstrations is often a desirable alternative to hand-crafting a robot's policy or specifying its cost function. Inverse reinforcement learning seeks to learn cost functions that reflect human preferences and induce human-like behaviors across different decision processes. However, human demonstration of sequential control, even from experts, is often suboptimal due in part to imprecision in the human visuomotor system and difficulties of accurately modeling its dynamics.

This suboptimality poses significant challenges to existing cost function learning approaches that seek to make demonstrated behavior optimal relative to all other possible behaviors. Maximum margin planning and maximum entropy inverse reinforcement learning, for example, are highly sensitive to suboptimal outliers. In practice, the set of training demonstrations should be carefully filtered of suboptimal outliers, but this is typically more art than science, with results that are undesirably sensitive to the nature of the data cleaning.

The present disclosure provides techniques for improving the performance of an autonomous vehicle (AV) by determining a plan for the AV that optimizes (e.g., minimizes) an initial cost function of a control algorithm of the AV. Conventional cost function learning methods that seek to minimize the cost of demonstrations (or maximize demonstration likelihood) relative to other alternatives can be susceptible to demonstration noise and/or suboptimality. The technique described herein proposes imitation learning methods that seek to make the plans (e.g., trajectories) induced by learned cost functions Pareto dominate human demonstrations by minimizing the sub-dominance by a margin.

Aspects of the present disclosure can provide several technical improvements to simulation, robotics, and autonomous vehicle technology. To help improve the performance of a robotic platform, such as an autonomous vehicle, the technology of the present disclosure improves the motion of a robot using an improved optimization algorithm for the initial cost function. The plan prediction is improved at least in part based on the optimization of the initial cost function of a control algorithm of the AV by reducing the influence of outlier demonstrations. As previously mentioned, maximum margin planning and maximum entropy inverse reinforcement learning are highly sensitive to suboptimal outliers. Thus, by reducing (e.g., filtering out) these suboptimal outliers, the system can improve the optimization of the initial cost function. Some of the benefits for optimizing the initial cost function using the techniques described herein include, but are not limited to, making the cruise control of the AV smoother, reducing the AV lateral nudging effect, reducing the AV lateral jerk effect, and other vehicle driving parameters.

Systems and methods described herein can improve drivability by optimizing the cost function. As a result, the system can achieve state-of-the-art performance for planning the motion of a robot. Additionally, the techniques described herein using an optimization algorithm can demonstrate better performance over existing state-of-the-art methods using internal real-world driving datasets as well as open-source datasets. The machine-learned models, such as the optimization algorithm, can learn to improve the motion plan determination of the robot. This, in turn, improves the functioning of simulation, robotics, and autonomous vehicle technologies by improving the optimization algorithm for motion plan determination of the robotic platform. Additionally, the imitation learning technique using robust Pareto dominance improves computational efficiency, improves human-in-the-loop intelligibility, reduces uncertainty, and maintains Fisher consistency. Ultimately, the techniques disclosed herein result in more accurate and robust plan determination for a vast array of robotic, vision, or autonomous vehicle technologies.

As an example, aspects of the present disclosure describe a method for improving performance of an autonomous vehicle (AV). The method includes determining a plan for the AV in a driving scenario that optimizes an initial cost function of a control algorithm of the AV. The initial cost function includes a plurality of cost dimensions, and a plurality of weights applied to the plurality of cost dimensions. The plan includes a plurality of estimated costs associated with the plurality of cost dimensions. Additionally, the method includes obtaining data describing an observed human driving path in the driving scenario. The data includes a first plurality of observed costs associated with the plurality of cost dimensions of the initial cost function. Moreover, the method includes determining, for each cost dimension in the plurality of cost dimensions, a quantity that compares the estimated cost to the observed cost of the observed human driving path. The method includes determining a function of a sum of the quantities determined for each cost dimension in the plurality of cost dimensions. Furthermore, the method includes using an optimization algorithm to adjust one or more weights of the plurality of weights applied to the plurality of cost dimensions to optimize the function of the sum of the quantities.

As another example, aspects of the present disclosure describe an autonomous vehicle control system for an autonomous vehicle (AV). The autonomous vehicle control system includes one or more processors and one or more non-transitory computer-readable media. The one or more non-transitory computer-readable media store an optimization algorithm and instructions. The optimization algorithm is configured to optimize an initial cost function of a control algorithm of an AV. The instructions, when executed by the one or more processors, cause the computing system to perform operations. The operations include determining a plan for the AV in a driving scenario that optimizes an initial cost function of a control algorithm of the AV. The initial cost function includes a plurality of cost dimensions, and a plurality of weights applied to the plurality of cost dimensions. The plan includes a plurality of estimated costs associated with the plurality of cost dimensions. Additionally, the operations include obtaining data describing an observed human driving path in the driving scenario. The data includes a first plurality of observed costs associated with the plurality of cost dimensions of the initial cost function. Moreover, the operations include determining, for each cost dimension in the plurality of cost dimensions, a quantity that compares the estimated cost to the observed cost of the observed human driving path. The operations also include determining a function of a sum of the quantities determined for each cost dimension in the plurality of cost dimensions. Furthermore, the operations include using an optimization algorithm to adjust one or more weights of the plurality of weights applied to the plurality of cost dimensions to optimize the function of the sum of the quantities.

As yet another example, aspects of the present disclosure provide a method for optimizing a cost function of a control system for an autonomous vehicle (AV) in a driving scenario. The method includes determining a plan for the AV in a driving scenario that optimizes an initial cost function of a control algorithm of the AV. The initial cost function includes a plurality of cost dimensions and a plurality of weights applied to the plurality of cost dimensions. The plan comprises a plurality of estimated costs associated with the plurality of cost dimensions. Additionally, the method includes obtaining data describing an observed human driving path in the driving scenario. The data includes a first plurality of observed costs associated with the plurality of cost dimensions of the initial cost function. Moreover, the method includes determining, for each cost dimension in the plurality of cost dimensions, a quantity that compares the estimated cost to the observed cost of the observed human driving path. The method also includes determining a function of a sum of the quantities determined for each cost dimension in the plurality of cost dimensions. Furthermore, the method includes using an optimization algorithm to adjust one or more weights of the plurality of weights applied to the plurality of cost dimensions to optimize the function of the sum of the quantities.

In some implementations, the method further comprises controlling a motion of the AV in accordance with the control algorithm of the AV. The control algorithm comprises adjustments made to the one or more weights applied to the plurality of cost dimensions of the initial cost function.

In some implementations, the function of the sum of the quantities includes a margin by which the estimated cost for each cost dimension in the plurality of cost dimensions exceeds the observed cost of the observed human driving path. Additionally, the margin is indicative of an expected dominance gap between the estimated cost and the observed cost.

In some implementations, the function includes a plurality of learned parameters associated with the plurality of cost dimensions. The method further includes, prior to adjusting the one or more weights of the plurality of weights, updating, using the optimization algorithm, the plurality of learned parameters to optimize an output of the function. Additionally, the method can include adjusting the one or weights based at least in part on the updated plurality of learned parameters.

In some implementations, the method further comprises updating, using the optimization algorithm, a respective margin slope for one or more cost dimension in the plurality of cost dimensions based on the adjusted one or more weights of the plurality of weights applied to the plurality of cost dimensions.

In some implementations, the function of the sum of the quantities comprises a respective margin slope for each cost dimension in the plurality of cost dimensions, and the method further comprises setting a value of the respective margin slope for each cost dimension in the plurality of cost dimensions based on the plan for the AV, and wherein the using of the optimization algorithm includes adjusting the one or more weights in the plurality of weights based on the respective margin slopes.

In some implementations, the one or more weights of the plurality of weights is adjusted to minimize the function of the sum of quantities.

In some implementations, the function of the sum of the quantities is optimized when the function of the sum of the quantities achieves a global minimum for all of the plurality of weights applied to the plurality of cost dimensions.

In some implementations, the function of the sum of the quantities is a total sum of the quantities determined for each cost dimension in the plurality of cost dimensions.

In some implementations, the plurality of cost dimensions includes a control cost, nudge lateral cost, or a lateral jerk cost.

In some implementations, the optimization algorithm comprises a machine-learned model that is trained based on the data describing the observed human driving path in the driving scenario.

In some implementations, the data further comprises a second plurality of observed costs associated with the plurality of cost dimensions of the initial cost function and the method further includes determining the observed cost of the observed human driving path by averaging, for each cost dimension in the plurality of cost dimensions, the first plurality of observed costs with the second plurality of observed costs.

In some implementations, the determined plan for the AV includes a human-behavior prediction portion and an AV-behavior prediction portion. Additionally, the method further includes generating a first sparse plan distribution based on the human-behavior prediction portion of the determined plan. Moreover, the method further includes generating a second sparce plan distribution based on the AV-behavior prediction portion.

Other example aspects of the present disclosure are directed to other systems, methods, vehicles, apparatuses, tangible non-transitory computer-readable media, and devices for generating data (e.g., hybrid graphs), training models, and performing other functions (e.g., predicting interactions between objects, predicting a trajectory or motion of an object) described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1A:
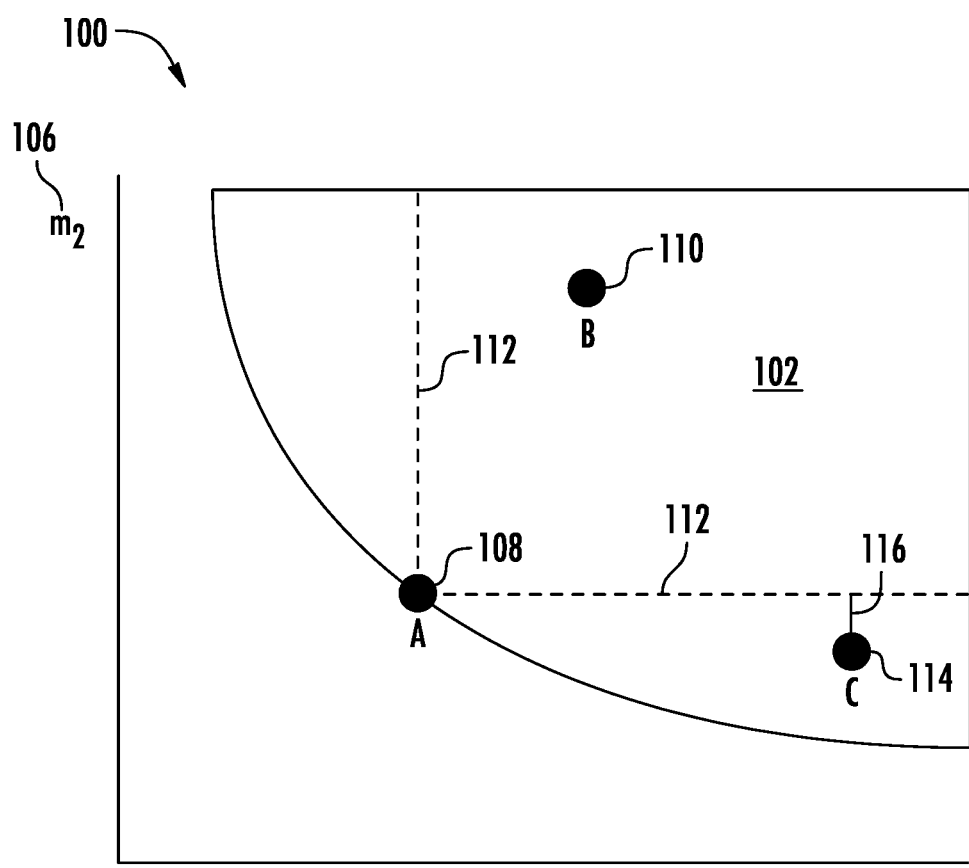
FIG. 1A is a plot of a plurality of sub-costs associated with a plurality of trajectories of an AV, according to some implementations of the present disclosure.

The following describes the technology of this disclosure within the context of an autonomous vehicle for example purposes only. The technology described herein is not limited to an autonomous vehicle and can be implemented within other robotic and computing systems. With reference now to FIGS. 1A-6, example embodiments of the present disclosure will be discussed in further detail.

Prevalent imitation learning methods seek to match human performance by learning cost functions that minimize the costs of demonstrated behaviors relative to all other possible behaviors. Many existing methods (e.g., maximum margin optimization or probabilistic models) are overly sensitive to suboptimal demonstrations, even to the point of degeneracy in some cases.

Aspects of the present disclosure are directed to systems and methods for improving the performance of an autonomous vehicle (AV) by determining a plan for the AV that optimizes (e.g., minimizes) an initial cost function of a control algorithm of the AV. Conventional cost function learning methods that seek to minimize the costs of demonstrations (e.g., maximize demonstration likelihood) relative to other alternatives can be susceptible to demonstration noise or suboptimality. The technique described herein is an imitation learning method that seek to make the plans (e.g., trajectories, AV plans) induced by learned cost functions Pareto dominate human demonstrations by minimizing the sub-dominance by a margin.

According to some embodiments of the present disclosure, techniques described herein seek to learn cost functions that induce Pareto dominance over demonstrations by minimizing a margin-augmented subdominance. Given that highly suboptimal demonstrations can be easily dominated, the techniques described herein allow for the model to ignore (e.g., remove) highly suboptimal demonstrations. Instead, less noisy demonstrations nearer to the Pareto frontier support the learned cost function. The generalization error bounds that are provided by the techniques described herein ensure that the imitator, with increasing probability, incurs lower cost on the unknown cost function of the demonstrator, even if that cost function differs for each demonstration. Generalized Pareto dominance provides cost guarantees for the imitator on the demonstrator's unknown cost function even when the demonstrator has different cost function weights for each demonstration.

Pareto Dominance Evaluation Metrics

According to some embodiments, a different guiding principle, in comparison to conventional systems, for cost function learning is presented. The guiding principle seeks to induce AV behavior that is unambiguously better than human demonstrations. Unfortunately, strict improvement over all demonstrated behaviors (e.g., Pareto dominance) is often difficult to achieve. Instead, techniques described herein minimize subdominance, such as a hinge-loss function of the expected Pareto dominance that measures the largest (or sum of) difference(s) in costs preventing induced behavior from Pareto dominating a demonstration. To help interpret the imitation learning objective, the techniques: (1) establish that the difference between an optimal behavior and a demonstrated behavior, characterized by cost features, decomposes into twice the subdominance of the optimal behavior and the suboptimality of the demonstration; and (2) illustrate that minimizing subdominance increases discrimination between the optimal behavior and demonstrations, while minimizing demonstration suboptimality increases indistinguishability.

Techniques for improving the performance of an AV include optimizing an AV plan (e.g., trajectory, AV motion plan). An example method to determine an optimal AV plan is to evaluate the AV plan with respect to a human demonstration. As previously mentioned, it is preferred that the AV plan is Pareto dominant over the human demonstrations, such that the determined plan outperforms a human demonstration with respect to every dimension of the cost function. For example, a different cost function can include a plurality of cost dimensions, and the AV plan is Pareto dominant when the plan has a cost in each dimension that is lower than the cost in each dimension of the human demonstration. As a result, for any positive weighting of the cost dimensions, the AV is outperforming human behavior when the AV plan is Pareto dominant. The AV plan Pareto dominates a human demonstration if, for each measure i: $m(\xi_{AV}) \leq m(\xi_{demo})$. To illustrate, the AV Pareto dominates the human demonstration in Example 1 because, in each cost dimension, the cost of the AV plan is less than the cost of the demonstration.

$$m(\xi_{AV})=|1\ 2\ 3| \text{ and } m(\xi_{demo})=|2\ 3\ 4| \qquad \text{(Example 1)}$$

However, in Example 2, the AV does not Pareto dominate the human demonstration because the cost of the AV plan in the third dimension (3) exceeds the cost of the demonstration (2).

$$m(\xi_{AV})=|1\ 2\ 3| \text{ and } m(\xi_{demo})=|4\ 3\ 2| \qquad \text{(Example 2)}$$

As noted, the dominance can prevent the AV from compensating for poor performance in one measure with super-human performance in other measures.

According to some embodiments, the techniques described herein augment the subdominance with a margin that requires the cost of the induced behavior to be less than the cost of the demonstration by a fixed amount in each dimension of the cost function for the subdominance to be zero. By using a margin, the techniques create a practical subdominance-minimizing learner that avoids degenerate solutions. Suboptimal demonstrations tend to be easy to Pareto dominate, and thus do not significantly influence the learned cost function. Instead, less noisy demonstrations between the learned subdominance margin boundaries and the Pareto frontier serve as support vectors of the learned cost function. Like support vector machines (SVMs), the generalization error in the techniques described herein is bounded by the ratio of non-support vectors to the total number of training demonstrations. By bounding or excluding the chance of the generalization error, lower costs on the unknown cost function are assured, even when unknown cost weights of a demonstrator vary between demonstrations. Unlike structured extensions of SVMs previously used for imitation learning in conventional systems, the techniques described herein are Fisher consistent, such that they can learn to produce behaviors that Pareto dominate the most demonstrations under ideal learning conditions. For supervised learning, Fisher consistency guarantees that in ideal learning conditions (e.g., learning over the class of all measurable functions using the population distribution), the Bayes optimal decision is learned. Unfortunately, margin-based methods for structured prediction generally inherit the Fisher inconsistency of multiclass support vector machines: if no majority label exists in the population distribution conditioned on a particular input, the SVM can fail to learn to predict a plurality label. However, using the techniques described herein, minimizing the margin-augmented sub-domination allows for Fisher consistency, unlike previous margin-based techniques. The techniques include monotonically increasing functions that preserve the Pareto dominance of the original feature space in order to achieve Fisher consistency.

Achieving Pareto dominance over a set of demonstrations can be difficult. Instead, sub-dominance, as illustrated in Equation 1 below, can quantify the gap from the AV being dominant, with $[f(x)]_+ = (O, f(x))$ denoting the hinge function.

$$\Sigma_i [m_i(\xi_{AV}) - m_i(\xi_{demo})]_+ \quad \text{(Equation 1)}$$

The gap in Equation 1 takes into account (e.g., penalizes) when the AV plan underperforms the human demonstration in each dimension but ignores (e.g., provides no added benefit) when the AV plan outperforms the human demonstration. In other words, Equation 1 is a sum of the cost dimensions of the cost function in which the AV did worse than the human demonstration, while ignoring the cost dimensions in which the AV outperformed the human demonstration.

In the context of AV motion planning, cost dimensions can include: the distance from the AV to another vehicle; the speed of the AV in relation to the speed limit; the location of the AV in relation to the lane boundaries; change in acceleration; the amount of brake pressure applied, jerkiness of the AV, and the like. An optimization algorithm can be used to determine the optimal balance between the different cost dimensions such that the output of Equation 1 above (or a similar equation measuring Pareto sub-dominance) is minimized.

FIG. 1A is a plot 100 of a plurality of sub-costs associated with a plurality of trajectories of an AV, according to some implementations of the present disclosure. The plot 100 assists in visualizing the space of plans (e.g., trajectories) in the shaded region 102 for a two-dimensional set of measures, namely $m_1$ 104 and $m_2$ 106. Measure $m_1$ 104 and measure $m_2$ 106 are two different cost dimensions (e.g., subcosts) of the cost function. The shaded region 102 includes all of the trajectories that a vehicle can take (e.g., the trajectories that are feasible in the vehicle). Each trajectory can have a different metric value for different cost dimensions (e.g., jerkiness, proximity to other vehicles, etc.).

In this example, trajectory A 108 dominates trajectory B 110 and all other trajectories within the upper right region defined by the dashed lines 112. When demonstrations are random, the expected dominance is the amount of probability assigned to trajectories within that upper right region. However, in this example, trajectory C 114 is not dominated by trajectory A 108 and has a dominance gap 116 determined by the gap between A and C in the $m_2$ 106 cost dimension.

Expected dominance is a general-purpose measure because it is interpretable as unambiguously better than a human driver and unaffected by differences in scale among the measures $m_i$. However, as previously mentioned, it can be difficult to optimize because it is discontinuous and non-differentiable. The dominance gap is more appropriate for numerical optimization, which is continuous and sub-differentiable. Additionally, the dominance gap bounds the expected dominance, given that numerical optimization is sensitive to measure scaling and is less interpretable.

For example, if the only demonstration was trajectory B 110, then an AV having trajectory A 108 would outperform the human demonstration in all cost dimensions. The challenge is that it may not be feasible for the AV plan to dominate all cost dimensions. Continuing with this example, in order to dominate trajectory C 114, the cost of trajectory A 108 in the $m_2$ cost dimension needs to be reduced (i.e., move downward). The problem with this type of optimization is that there is often a degenerate solution. In a degenerate solution, everything has zero cost (e.g., metrics are zero), so it is not a useful solution for the AV plan. Therefore, by adding a per-measure slack term $\xi_i$, where the AV plan needs to dominant the human demonstration by a margin, the model penalizes for not Pareto dominating a solution. In practice, by having a margin, the techniques described herein push the AV plan to outperform the human demonstrations by a significant amount, and not just barely better than the human demonstrations.

According to some embodiments, measuring near-dominance can be possible by incorporating per-measure slack terms $\xi_i$, as illustrated in Equation 2.

$$E[\Sigma_i [m_i(\xi_{AV}) - m_i(\xi_{demo}) - \xi_i]_+ = 0] \quad \text{(Equation 2)}$$

In some instances, measuring near-dominance may be preferable if actual dominance is difficult to attain (e.g., due to coarse trajectory sampling or stricter constraints on AV trajectories).

Additionally, for cost function learning, the expected margin-augmented dominance gap can be calculated with margin $\xi_i$, as illustrated in Equation 3. The expected margin-augmented dominance gap is useful to avoid the degeneracy of learning to make all measures equal to zero.

$$E[\Sigma_i [m_i(\xi_{AV}) - m_i(\xi_{demo}) + \varepsilon_i]_+ \quad \text{(Equation 3)}$$

For linear cost functions, only the degenerate solution w=0 can fully minimize suboptimality, or, for richer representation learning methods, the feature function must be Equation 3. From this perspective, suboptimality measures the inherent differences in quality between demonstrations. Suboptimality minimization reduces the imitator's ability to distinguish more desirable from less desirable behaviors. Thus, minimizing the differences between optimal behaviors and demonstrated behaviors without explicitly reducing the ability to distinguish behavior quality reduces to minimizing the subdominance.

Learning Cost Functions via Margin-Based Subdominance Minimization

According to some embodiments, the imitation learning techniques can seek to make the plans (e.g., trajectories, AV plans) induced by the learned cost functions to be Pareto dominant over human demonstrations by minimizing the subdominance by a margin.

Figure 1B:
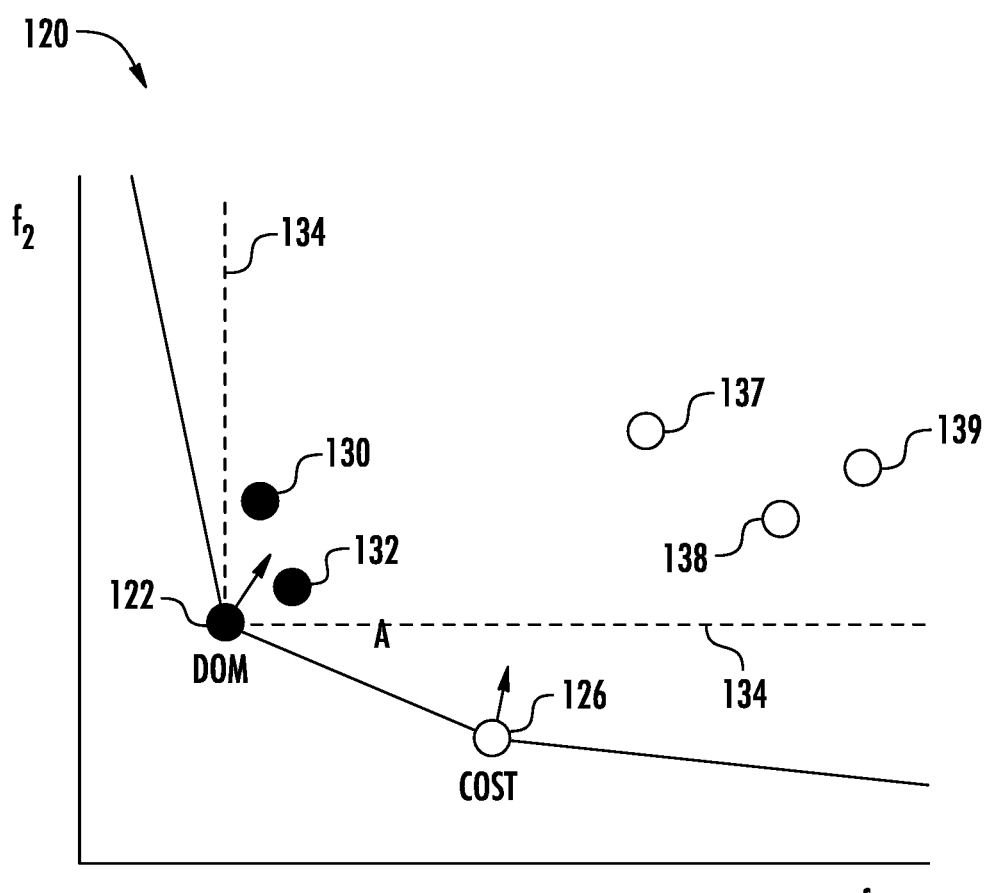
FIG. 1B is a plot of a plurality of sub-costs associated with a plurality of trajectories of an AV with Pareto dominance boundaries, according to some implementations of the present disclosure.

To illustrate the process of subdominance minimization, FIG. 1B is a plot of a plurality of sub-costs associated with a plurality of trajectories of an AV with Pareto dominance boundaries, according to some implementations of the present disclosure.

As previously mentioned, cost function learning methods that seek to minimize the costs of demonstrations, or maximize demonstration likelihood, relative to other alternatives are susceptible to demonstration noise or suboptimality. The demonstration noise or suboptimality can shift a first AV plan 122 induced by a learned cost function from one that fits higher quality demonstrations (e.g., demonstrations 130, 132) well and is probably better than all demonstrations (e.g., bounded by learned-margin boundary 134) to a second AV plan 126 that better minimizes the costs of outlier demonstrations (e.g., demonstrations 137, 138, 139) while diminishing guarantees of superior performance. In this example, the shift for the first AV plan 122 to the second AV plan 126 would be an unwanted shift because the first AV plan 122 fits higher quality demonstrations. The arrows correspond to cost weight directions that induce 122 or 126. For example, when only demonstrations 130 and 132 are used to learn the cost weights, existing methods and techniques described herein are likely to produce 122 for the AV's behavior. When 130, 132, 137, 138, and 139 are used to learn the cost weights, other methods will often provide 126 for the AV's behavior, while the techniques described herein will continue to produce 122.

According to some embodiments, the imitation learning techniques seek to produce behaviors induced by learned weights that Pareto dominate all demonstrations (e.g., have every sub-cost lower than those of demonstrations). Since Pareto dominance may not always be achievable, the subdominance (e.g., difference from Pareto domination by a margin) is instead minimized, as shown in Equation 4.

$$subdom_{\alpha,\beta}(\xi, \xi') \triangleq \sum_{k=1}^{K} [\alpha_k(f_k(\xi) - f_k(\xi')) + \beta_k]_+ \quad \text{(Equation 4)}$$

In Equation 4, $\alpha$ and $\beta$ parameterize the margin slope and intercept (e.g., margin amount) for the $k^{th}$ sub-cost. In some instances, one of the sub-costs can be fixed, and the optimization algorithm can learn the other sub-costs in the support vector machine literature. For example, the optimization algorithm can fix $\beta=1$ and learn $\alpha$ parameters. The goal of the optimization algorithm is to learn cost function weights w for the induced trajectory $\xi^*(w)$ that minimize the subdominance illustrated in Equation 5.

$$\min_{\alpha \geq 0, w > 0} \sum_{i=1}^{N} subdom_{\alpha,1}(\xi^*(w), \xi_i)$$

Figure 1C:
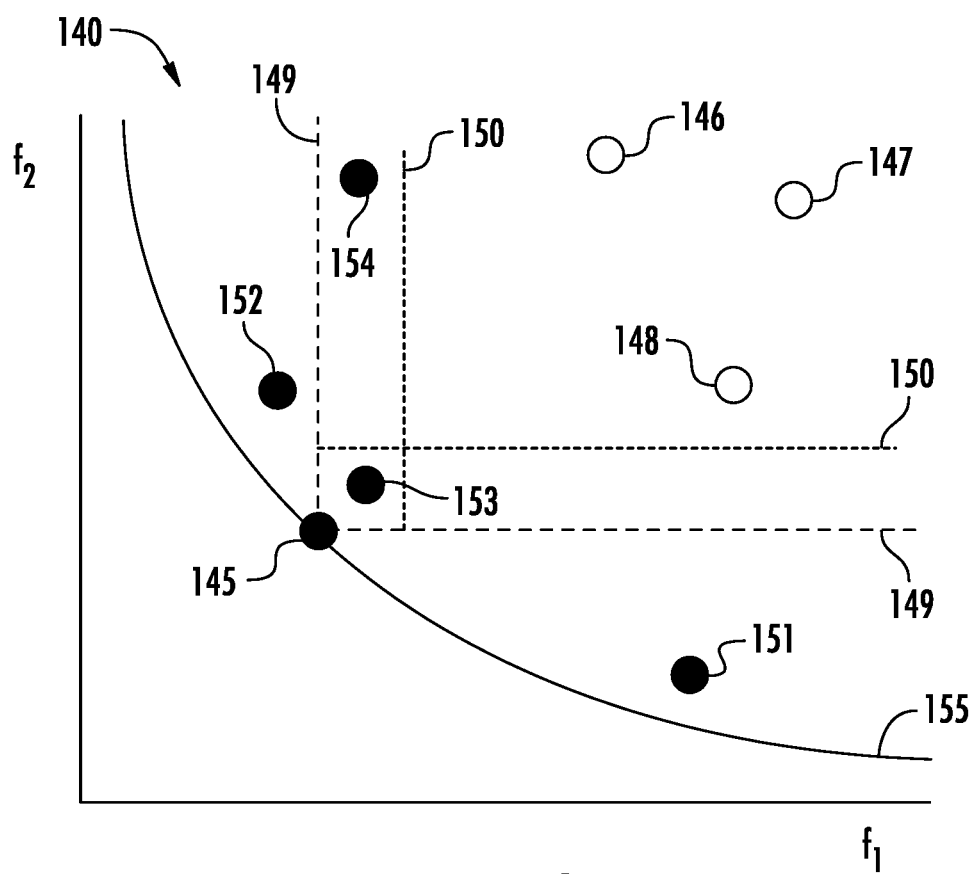
FIG. 1C is a plot of a plurality of sub-costs associated with a plurality of trajectories of an AV with margin-based subdominance boundaries, according to some implementations of the present disclosure.

To illustrate the margin-based subdominance minimization, FIG. 1C is a plot of a plurality of sub-costs associated with a plurality of trajectories of an AV with margin-based subdominance boundaries, according to some implementations of the present disclosure.

The optimal trajectory $\xi^*(w)=\text{argmax}_\xi \, wTf(\xi)$ and the margin slope a partition plans (e.g., trajectories, demonstrations) that have subcosts that are margin-dominated or not margin-dominated. FIG. 1F further describes the determination of the margin slope $\alpha_k$. For example, demonstrations 146, 147, 148 have subcosts that are margin-dominated, as defined by the margin boundaries 150. Additionally, the demonstrations 151, 152, 153, 154 have subcosts that are not margin-dominated and lie between the margin boundaries 150 and the Pareto frontier 155.

As illustrated in this example, the AV plan 145 is Pareto dominant over all the demonstrations (e.g., demonstrations 146, 147, 148, 153, 154) inside the Pareto dominant boundaries 149. Additionally, the AV plan 145 is Pareto dominant by a margin over the demonstrations (e.g., demonstrations 146, 147, 148) inside the margin boundaries 150. Furthermore, the AV plan 145 is Pareto dominant over demonstrations 152, 153, but not by the margin. Moreover, subdominance has to be greater than 1 to be a valid upper-bound on the Pareto dominance loss function. The margin boundary is determined, by the optimization algorithm, based on the margin slope $\alpha$.

In some instances, the optimization algorithm determines (e.g., learns) the margin boundaries 150, based on obtained human demonstration data, by determining the parameters (e.g., weights) for each cost dimension of the AV plan 145 that can minimize the subdominance. The subdominance can be an upper bound on the Pareto dominance. In one example, when the AV plan 145 is Pareto dominant by a margin over all of the human demonstrations (e.g., all demonstrations are inside the margin boundaries 150), then the AV plan 145 does not need to be modified.

Batch Single-Scenario Learning

Figure 1D:
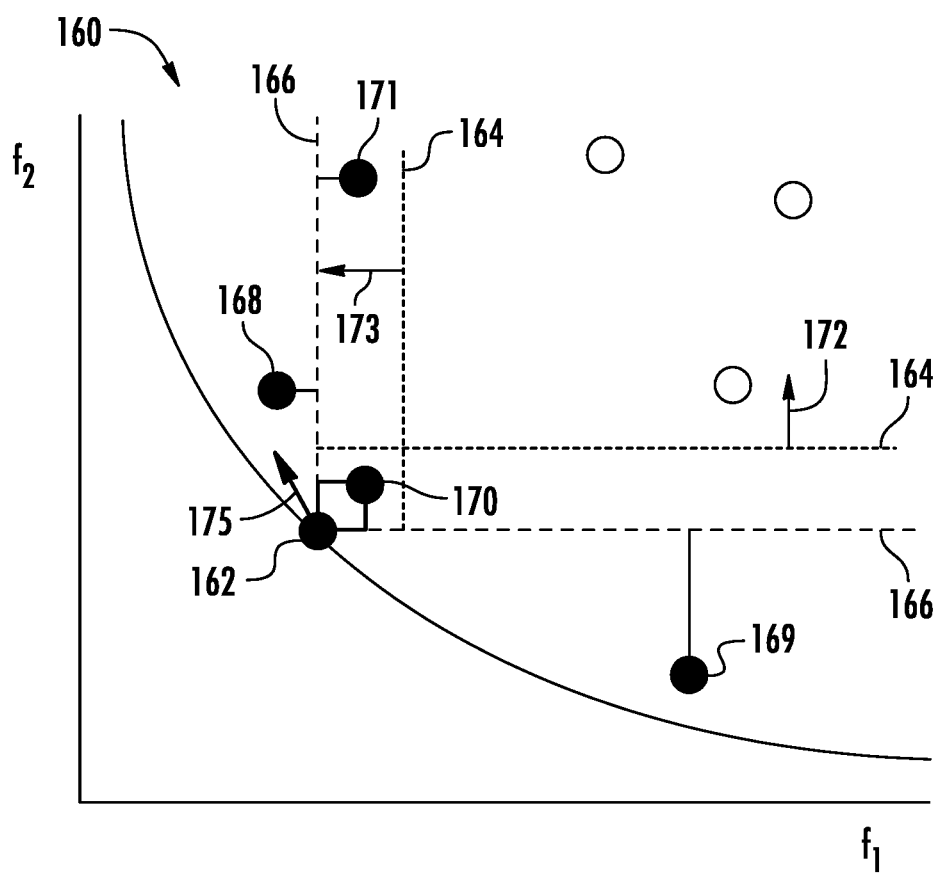
FIG. 1D is a plot of a plurality of sub-costs associated with a plurality of trajectories of an AV for batch single-scenario learning, according to some implementations of the present disclosure.

FIG. 1D is a plot of a plurality of sub-costs associated with a plurality of trajectories of an AV for batch single-scenario learning, according to some implementations of the present disclosure. According to some embodiments, the optimization algorithm is trained using batch single-scenario learning. The single-scenario learning is an illustrative setting to better understand how the margin boundaries and margin slopes are learned in the optimization algorithm. In the batch single-scenario training method, all demonstrations are obtained from the same scenario (e.g., adaptive cruise control, turning left, merging).

First, a computing system (e.g., non-transitory computer-readable media that store an optimization algorithm) obtains the AV plan 162 that is optimal for the current cost function weights w. Next, the computing system determines (e.g., sets, learns) the margin boundaries 164 based on the optimal plan. Conceptually, the demonstrations that have lower cost than the optimal plan push to flatten (i.e., reduce) the margin slope $\alpha_k$, which moves the margin boundaries 164 away from the optimal plan's cost. FIG. 1F further describes the determination of the margin slope $\alpha_k$.

Demonstrations that reside between the margin boundaries 164 and Pareto dominance boundaries 166 push to steepen (i.e., increase) the margin slope and shrink the margin boundary. The strength of these forces increases farther from the Pareto dominance boundaries 166. These competing forces can be approximately canceled out by setting the margin boundaries 164 to balance the competing forces.

Finally, the cost function weights w are updated to reduce the margin-augmented subdominance. The subdominance is only quasi-convex in w, since $\text{argmax}_\xi \, wTf(\xi)$ (e.g., from Equation 5) creates discontinuities. In some instances, weight $w_k$ for sub-cost k is increased based on the number of support vectors beyond the margin boundaries 164 weighted by the margin slope αk. In some instances, the margin slope αk can be the distance between the margin boundaries 164 and the Pareto dominance boundaries 166.

In this example, the margin slope αk can be set or predetermined by the optimization algorithm. Then, the optimization algorithm can obtain the demonstrations 168, 169, 170, 171, where each demonstration has different sub-cost for f1 and f2 values, to modify the margin slope αk. It can be noted that the demonstrations (not numbered) that are inside the margin boundaries 164 (e.g., demonstrations that are margin-based Pareto dominant) are excluded when modifying (e.g., updating) the margin slope. By excluding the demonstrations inside the margin boundaries, the optimization algorithm can optimize the AV plan to outperform the best-case human scenarios. Conceptually, when the margin slope αk is steep, there is a large penalty for the demonstrations that are farther away from the boundaries. Additionally, when the margin boundaries 164 are farther in, the margin slope αk is shallower.

In the first part of the optimization algorithm optimization, the computing system readjusts the margin boundaries 164 to better fit the obtained demonstrations 168, 169, 170, 171, and balance them across the Pareto dominance boundaries 166. The readjustment is shown by the first arrow 172 shifting a portion of the margin boundary 164 upwards and the second arrow 173 shifting a portion of the margin boundary 164 to the left.

In the second part of the optimization algorithm optimization, the computing system modifies the weights w to reduce the amount of margin-augmented subdominance. The modifications of the weights w result in the AV plan 162 shifting (e.g., shifting left, shifting right) to reduce the amount of subdominance. For illustrative purposes, in the plot 160, there are three demonstrations (demonstrations 168, 170, 171) to the left of the AV plan 162, while only one demonstration (demonstration 169) to the right of the AV plan 162. Therefore, the AV plan 162 shifts left as shown by the third arrow 175. The computing system can optimize (e.g., reduce the amount of margin-augmented subdominance) the AV plan 162 using optimization techniques such as stochastic sub-gradient method, local descent method, bracketing (e.g., bisection) method, differential objective function, Cross-Entropy method, and so on.

Learning with One Demonstration Per Scenario

According to some embodiments, the optimization algorithm is trained using one demonstration per scenario. In this training method, the optimization algorithm obtains a single demonstration for each scenario. In some instances, the optimization algorithm can motivate an online learning algorithm based on stochastic method optimization, but other optimization techniques can also be used to train the optimization algorithm.

In this illustrative example, an online algorithm using exponentiated stochastic gradient is used to train the optimization algorithm. The computing system initializes w and α (e.g., to 1) and selects learning rate it. In one example, the learning rate $\eta_t$ equals c1/(c2+t), where c1 and c2 are problem-dependent constants and t is the iteration of the learning algorithm (e.g., when training on the t-th example it has available). For example, c1 can be 1000 and c2 can be 2000. The learning rate can be an asymptotic rate between $1/t$ and $1/t^2$. Then for each example $\xi$, the following steps can be performed:

Step 1. Generate the optimal plan $\xi^*(w)$ for the current weights w.
Step 2. Margin slope update.
For each subcost k, update margin slope $\alpha_k$:
if $\alpha_k \, (f_k(\xi^*(w)) - f_k(\xi)) + 1 > 0$:
$\alpha_k \leftarrow \alpha_k \exp(\eta_t (f_k(\xi) - f_k(\xi^*(w))))$
Step 3. Cost function weight update.
For each subcost k, update cost function weights
if $\alpha_k \, (f_k(\xi^*(w)) - f_k(\xi)) + 1 > 0$:
$w_k \leftarrow w_k \exp(\eta_t \alpha_k)$
Renormalize cost function weights
$w \leftarrow w / \|w\|$ As described in the steps above, the computing system first updates the margin slope, then updates the cost function weights using the obtained demonstration and margin boundaries. As previously mentioned, this illustrative example uses an exponentiated gradient method, but other optimization techniques can be used to optimize the machine-learned model.

In some instances, the computing system can make smaller optimization steps when updating the optimization algorithm by obtaining a single demonstration at a time, instead of fully optimizing the optimization algorithm when obtaining a batch of demonstrations for a single scenario.

According to some embodiments, adaptive cruise control is an example driving scenario for optimizing the AV plan. Other driving scenarios can include, but are not limited to, merging, turning, passing a vehicle, trajectory at an intersection, and so on. The cost dimensions for adaptive cruise control includes, but are not limited to, jerkiness of trajectory, position in lane, vehicle speed in comparison to the speed limit, position in lane, proximity of vehicle to current lane, proximity of vehicle to adjacent lane, proximity of vehicle to the side of a road, softness of vehicle stop, fuel consumption, drive time to destination. The optimization algorithm determines the different tradeoffs, using the training techniques described herein, between these cost dimensions to determine an optimal trajectory plan.

Optimizing Subdominance Using Robust Pareto Dominance

As an alternative embodiment to the margin-based subdominance minimization, the learning cost functions can be optimized via subdominance using robust Pareto dominance. As mentioned, Pareto domination defines unambiguously better decision making in driving and other multi-objective decision processes. Extending this notion, the optimization algorithm seeks to learn a motion planner that robustly minimizes the distance to domination across multiple cost dimensions, ideally reducing it to zero and dominating all demonstrations. Rather than minimizing the gap with respect to empirical demonstration samples, which can be highly susceptible to overfitting, the robust aspect of the training technique obtains a worst-case, game-theoretic estimate of the policy of a demonstrator for evaluating the expected domination distance. Some of the benefits of this approach include sparsity, robustness, better planning, and fisher consistency.

First, with sparsity, the learned policies have non-zero probability on a small number of plans representing the extreme points of plausible human driving. As a technical improvement, the imitation learning technique using robust Pareto dominance improves computational efficiency and human-in-the-loop intelligibility compared to dense distributions, which are difficult to approximate or sample from and interpret.

Second, with robustness, the optimization algorithm reduces uncertainty. By design, any uncertainty resulting from limited amounts of available demonstrations impacts the planner during training (e.g., diminishing the planner's relative performance). Therefore, by reducing uncertainty, the technique improves the relative performance of the planner.

Third, the AV plan can be better planned based on predictions of human behaviors. For example, human drivers' plans and prescribing plans for the AV are not equivalent. Human drivers may violate requirements that the AV must obey. The imitation learning techniques using robust Pareto dominance can remove the outlier demonstrations (e.g., human demonstrations that violate requirements). Additionally, other human idiosyncrasies that should not be explicitly imitated by the AV can be removed or ignored during the imitation learning. A set of weighted metrics that are separate from learned costs rationalizing human demonstrations enables better AV planning.

Finally, the optimization algorithm can obtain fisher consistency. In the ideal limits of learning (e.g., infinite training data, arbitrarily complex features), the imitation training approach learns to make plans that minimize suboptimality across multiple metrics even if the demonstrations are extremely noisy. This theoretical property has practical implications because inconsistent methods tend to learn parameters that cause the optimization algorithm to collapse (e.g., learned costs that go to zero). For supervised learning, Fisher consistency guarantees that in ideal learning conditions (e.g., learning over the class of all measurable functions using the population distribution), the Bayes optimal decision is learned. Unfortunately, margin-based methods for structured prediction generally inherit the Fisher inconsistency of multiclass support vector machines: if no majority label exists in the population distribution conditioned on a particular input, the support vector machines can fail to learn to predict a plurality label.

In the robust training technique, rather than outperform specific demonstrations, the computing system trains the AV to do well against some worse case approximation of human demonstrations.

Figure 1E:
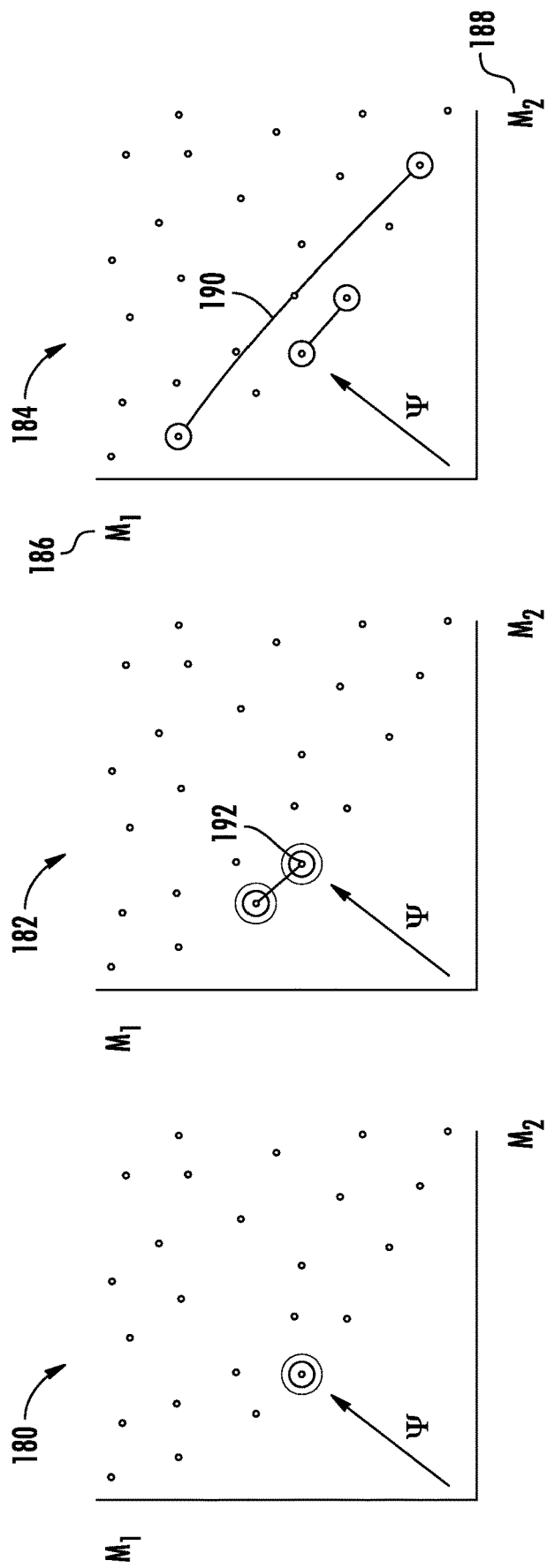
FIG. 1E is a plurality of plots of demonstrations used to train a cost function, according to some implementations of the present disclosure.
Figure 1F:
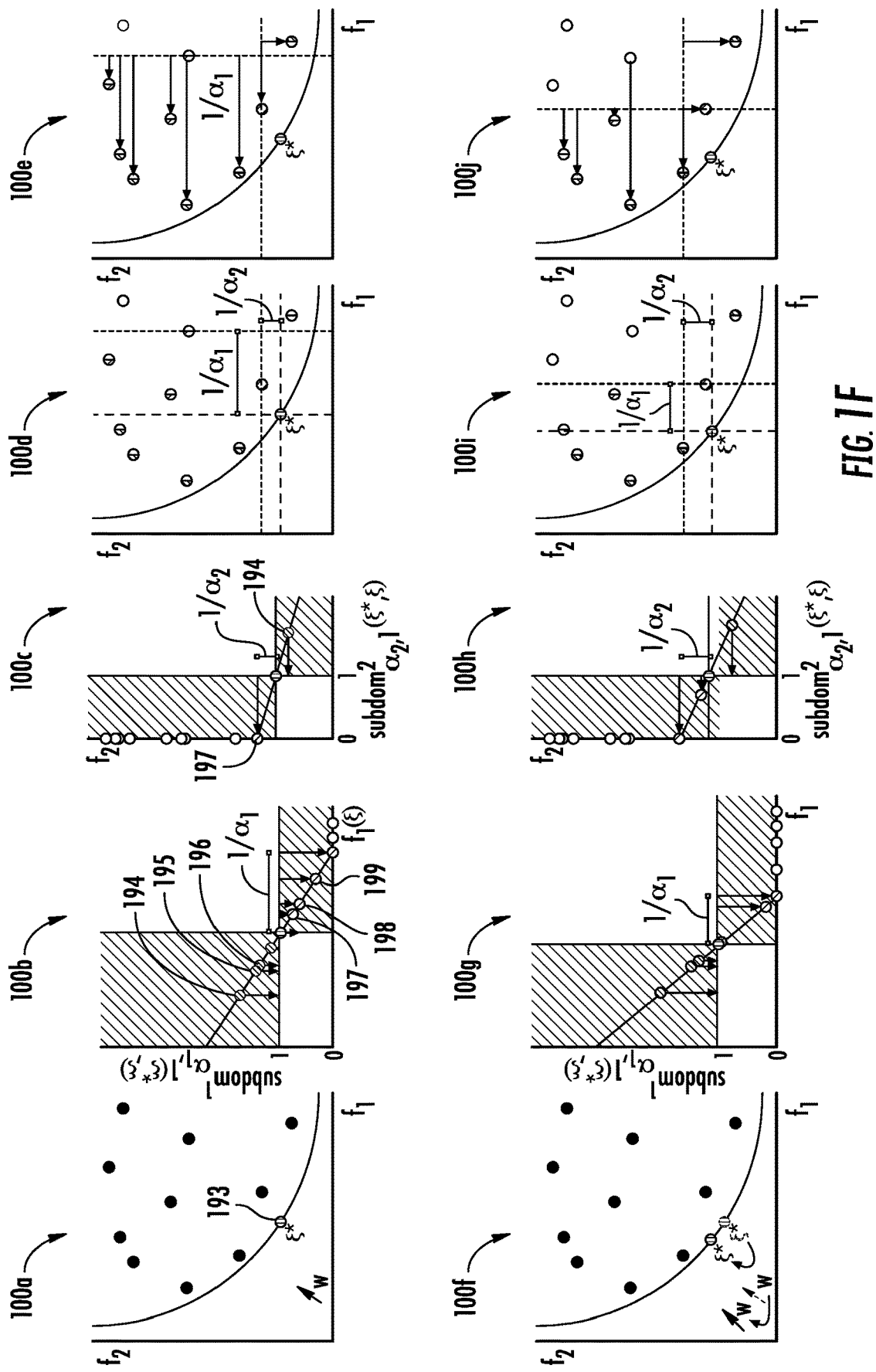
FIG. 1F are a plurality of plots of sub-costs associated with updating the margin slope α and weight w, according to some implementations of the present disclosure.

FIG. 1E is a plurality of plots of demonstrations used to train a cost function, according to some implementations of the present disclosure. In some instances, the optimization algorithm is trained, by the computing system, to measure a matrix with cost dimension m1 186 and cost dimension m2 188 by determining an average for the obtained demonstrations. Using the determined average, the optimization algorithm determines a distribution over different trajectories that are based on similar statistics and expectations.

In plot 184, line distribution 190 is a human proximation of the worse-case scenario for the demonstrations. In plot 182, the planner, using the optimization algorithm, can be employed to minimize error due to human proximations by determining a more robust line distribution 192. It is more robust by removing (e.g., ignoring) noisy demonstrations. In contrast, plot 180 illustrates how a conventional optimization algorithm approach would fail to find the margin boundaries because the conventional optimization algorithm would fail to optimize over the correct demonstrations.

FIG. 1F are a plurality of plots 100a-100j of sub-costs associated with updating the margin slope α and weight w, according to some implementations of the present disclosure. The optimal behavior 193 for an initial weight factor w is obtained at plot 100a. The optimal margin slope $\alpha_1$ in plot 100b and optimal margin $\alpha_2$ in plot 100c are chosen from all possible slopes (gray shaded region) to minimize subdominance, which can be achieved by including dominated support vectors 194, 195, 196 to offset the gradients from nondominated support vectors 197, 198, 199. These define the margin boundaries (dotted lines) in plot 100d. Since the number of demonstrations with positive subdomination from feature 1 (weighted by $\alpha_1$) in plot 100d is much larger than feature 2 in plot 100e, the weight of feature 1 is increased and a new optimal behavior is obtained in plot 100f. Therefore, optimizing $\alpha_1$ in plot 100g and $\alpha_2$ in plot 100h for this new optimal behavior provides new margin boundaries in plot 100i and new weight gradients in plot 100j.

Exponentiated Stochastic Optimization

Generalization over many decision processes that are assumed to share a common reward function is often desired and is the primary motivation for learning a generalizable reward function rather than estimating a single policy directly. Typically, a single demonstration is available from one or more decision processes and the batch-based perspective of identifying support vectors cannot be easily leveraged.

Given the current optimal trajectory, $\xi^*(w)$, the optimization algorithm can employ an analytical sub-gradient to perform an exponentiated update for the margin slope variable:

$$\alpha_k \leftarrow \alpha_k \exp(\eta_t(f_k(\xi^*(w)) - f_k(\tilde{\xi})))$$

In Equation 7, for the k in which $\xi$ is a support vector and using an appropriately chosen learning rate nt. In Equation 7, $f_k$ is the kth subcost for its argument trajectory, $\xi(w)$ is a demonstration trajectory, w is a vector of weights for each of the subcosts, $\xi^*(w)$ is a minimum or low-cost trajectory produced by the planner to ideally minimize the cost function obtained from cost weights w, and the αk is the margin slope for the kth subcost.

The optimization algorithm employs a similar exponentiated sub-gradient update for cost weights w:

$$w \leftarrow w \odot \exp(\eta_t \partial_w \mathrm{subdom}_{\alpha_k, 1}{}^k(\xi^*(w), \tilde{\xi}))$$

In Equation 8, for the k in which $\xi$ is a support vector, and where ⊙ denotes element-wise multiplication. We first note that 0 is a sub-gradient for all examples ξi with zero subdominance, and the objective is smooth for examples with positive subdominance assuming the underlying optimal control problem is smooth.

The exponentiated stochastic optimization approach has the benefit of allowing E to be adaptively chosen so that an informative direction for improvement is provided even when the underlying optimal control problem is discrete or continuous but not smooth.

Figure 2A:
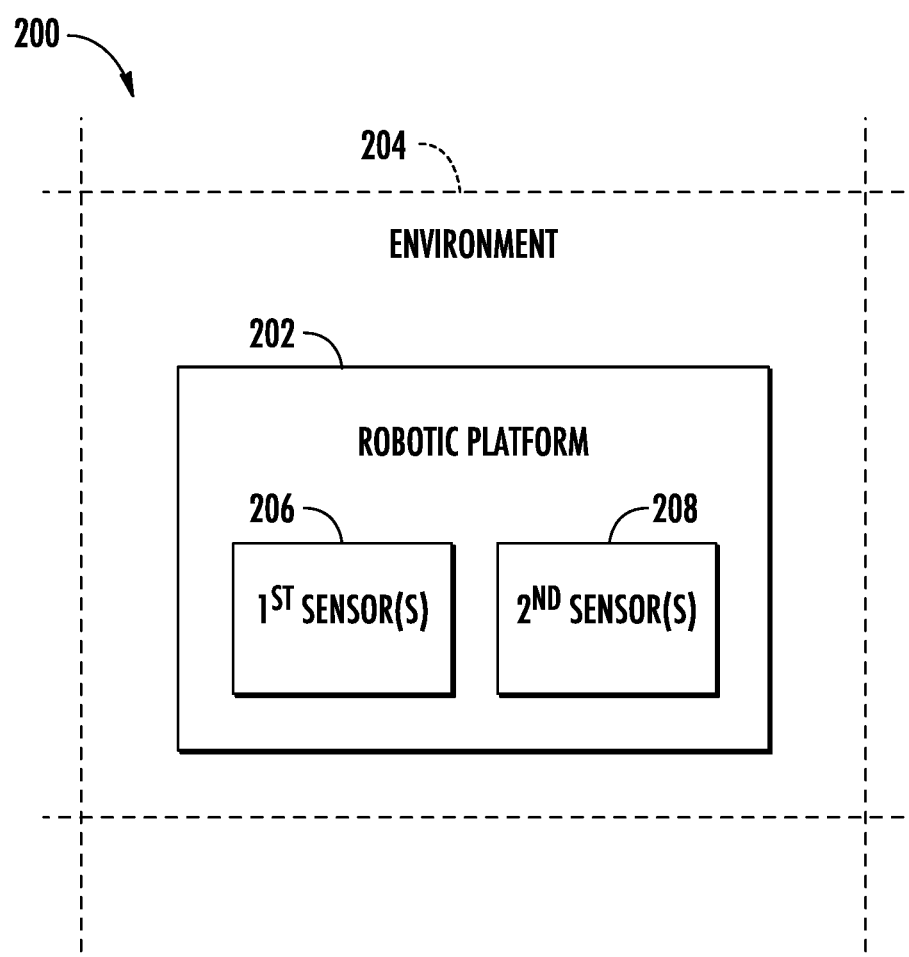
FIG. 2A is a block diagram of an operational scenario, according to some implementations of the present disclosure.

FIG. 2A is a block diagram of an operational scenario 200, according to some implementations of the present disclosure. The operational scenario 200 includes a robotic platform 202 and an environment 204. The robotic platform 202, for example, can operate within the environment 204 using a control algorithm of the robot (e.g., AV). The control algorithm can determine a motion plan for the robot. An optimization algorithm can optimize the motion plan to improve performance of the robot. The environment 204 can be external to the robotic platform 202. The environment 204 can include an indoor environment (e.g., within one or more facilities) or an outdoor environment.

The robotic platform 202 can include one or more sensor(s) 206, 208. The one or more sensors 206, 208 can be configured to generate or store data descriptive of the environment 204 (e.g., one or more static or dynamic objects therein). The sensors 206, 208 can be configured to obtain object data. For example, the object data can have position data and velocity data for a first object and a second object. The sensors 206, 208 can be configured to obtain traffic element data associated with a traffic element. For example, the traffic element data can include data describing locations of traffic elements (e.g., stop signs or traffic lights) within the environment 204. The locations can be associated with a map of the environment. The sensor(s) 206, 208 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 206, 208 can include multiple sensors of different types. For instance, the sensor(s) 206, 208 can include one or more first sensor(s) 206 and one or more second sensor(s) 208. The first sensor(s) 206 can include a different type of sensor than the second sensor(s) 208. By way of example, the first sensor(s) 206 can include one or more imaging device(s) (e.g., cameras, etc.), whereas the second sensor(s) 208 can include one or more depth measuring device(s) (e.g., LiDAR device, etc.).

The robotic platform 202 can include any type of platform configured to operate with the environment 204. For example, the robotic platform 202 can include one or more different type(s) of vehicle(s) configured to perceive and operate within the environment 204. The vehicles, for example, can include one or more autonomous vehicle(s) such as, for example, one or more autonomous trucks. By way of example, the robotic platform 202 can include an autonomous truck including an autonomous tractor coupled to a cargo trailer. In addition, or alternatively, the robotic platform 202 can include any other type of vehicle such as one or more aerial vehicles, ground-based vehicles, water-based vehicles, space-based vehicles, etc. The robotic platform 202 can carry passengers, cargo, both, or neither.

Figure 2B:
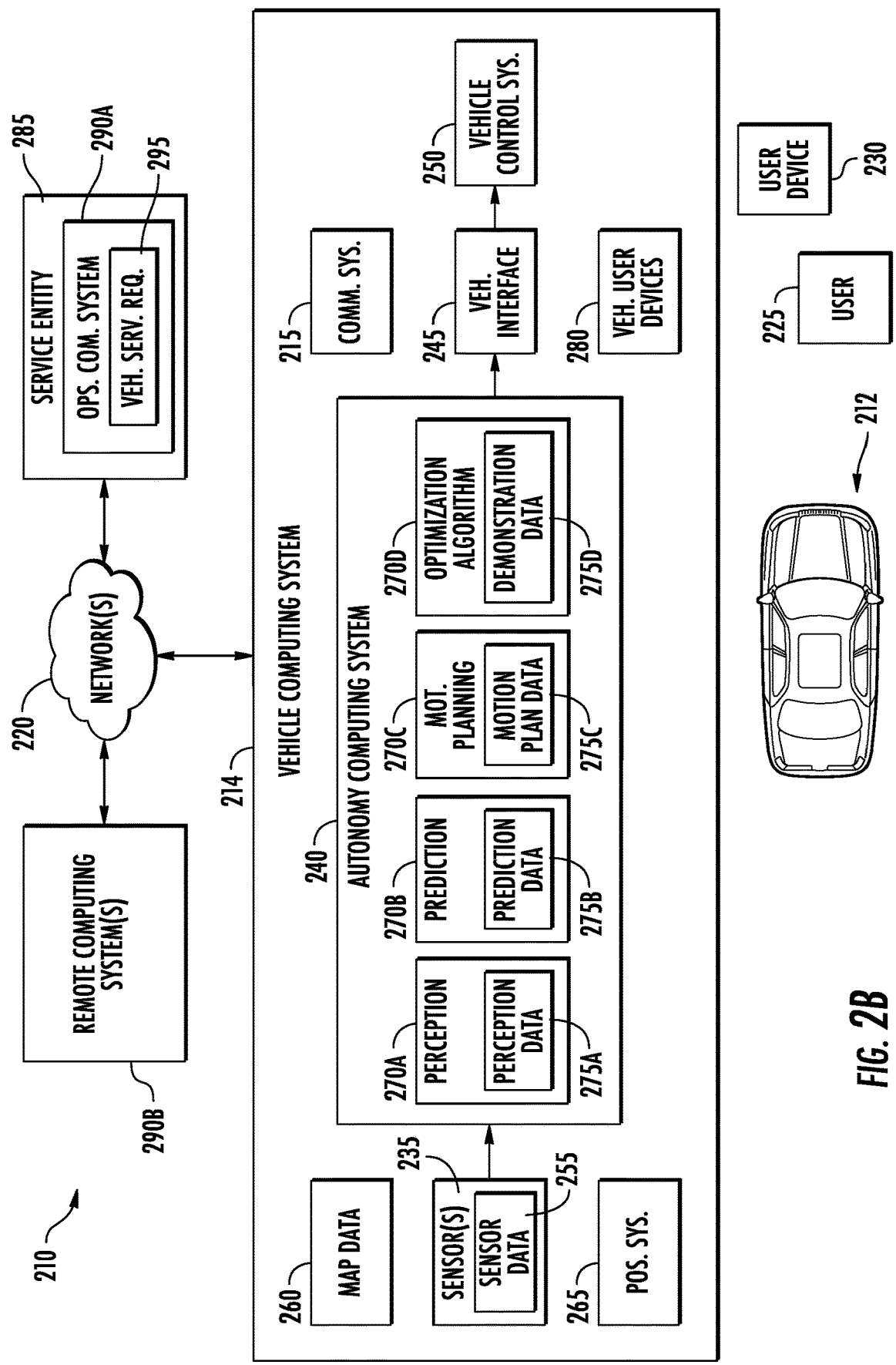
FIG. 2B is a block diagram of a system, according to some implementations of the present disclosure.

FIG. 2B depicts an overview of an example system 214 of the robotic platform (e.g., robotic platform 202 of FIG. 2A) as an autonomous vehicle according to example implementations of the present disclosure. More particularly, FIG. 2B illustrates a vehicle 212 including various systems and devices configured to control, using a control algorithm, the operation of the vehicle 212. For example, the vehicle 212 can include an onboard vehicle computing system 214 (e.g., located on or within the autonomous vehicle, etc.) that is configured to operate the vehicle 212. Generally, the vehicle computing system 214 can obtain sensor data 255 from a sensor system (e.g., sensor(s) 206, 208 of FIG. 2A and/or sensors 235 of FIG. 2) onboard the vehicle 212, attempt to comprehend the vehicle's surrounding environment by performing various processing techniques on the sensor data 255, and generate an appropriate motion plan through the vehicle's surrounding environment (e.g., environment 204 of FIG. 1).

The vehicle 212 incorporating the vehicle computing system 214 can be various types of vehicles. For instance, the vehicle 212 can be an autonomous vehicle. The vehicle 212 can be a ground-based autonomous vehicle (e.g., car, truck, bus, etc.). The vehicle 212 can be an air-based autonomous vehicle (e.g., airplane, helicopter, vertical take-off and lift (VTOL) aircraft, etc.). The vehicle 212 can be a lightweight elective vehicle (e.g., bicycle, scooter, etc.). The vehicle 212 can be another type of vehicle (e.g., watercraft, etc.). The vehicle 212 can drive, navigate, operate, etc. with minimal or no interaction from a human operator (e.g., driver, pilot, etc.). In some implementations, a human operator can be omitted from the vehicle 212 (or also omitted from remote control of the vehicle 212). In some implementations, a human operator can be included in the vehicle 212.

The vehicle 212 can be configured to operate in a plurality of operating modes. The vehicle 212 can be configured to operate in a fully autonomous (e.g., self-driving) operating mode in which the vehicle 212 is controllable without user input (e.g., can drive and navigate with no input from a human operator present in the vehicle 212 or remote from the vehicle 212). The vehicle 212 can operate in a semi-autonomous operating mode in which the vehicle 212 can operate with some input from a human operator present in the vehicle 212 (or a human operator that is remote from the vehicle 212). The vehicle 212 can enter into a manual operating mode in which the vehicle 212 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 212 can be configured to operate in other modes such as, for example, park or sleep modes (e.g., for use between tasks/actions such as waiting to provide a vehicle service, recharging, etc.). In some implementations, the vehicle 212 can implement vehicle operating assistance technology (e.g., collision mitigation system, power assist steering, etc.), for example, to help assist the human operator of the vehicle 212 (e.g., while in a manual mode, etc.).

To help maintain and switch between operating modes, the vehicle computing system 214 can store data indicative of the operating modes of the vehicle 212 in a memory onboard the vehicle 212. For example, the operating modes can be defined by an operating mode data structure (e.g., rule, list, table, etc.) that indicates one or more operating parameters for the vehicle 212, while in the particular operating mode. For example, an operating mode data structure can indicate that the vehicle 212 is to autonomously plan its motion when in the fully autonomous operating mode. The vehicle computing system 214 can access the memory when implementing an operating mode.

The operating mode of the vehicle 212 can be adjusted in a variety of manners. For example, the operating mode of the vehicle 212 can be selected remotely, off-board the vehicle 212. For example, a remote computing system (e.g., of a vehicle provider or service entity associated with the vehicle 212) can communicate data to the vehicle 212 instructing the vehicle 212 to enter into, exit from, maintain, etc. an operating mode. By way of example, such data can instruct the vehicle 212 to enter into the fully autonomous operating mode.

In some implementations, the operating mode of the vehicle 212 can be set onboard or near the vehicle 212. For example, the vehicle computing system 214 can automatically determine when and where the vehicle 212 is to enter, change, maintain, etc. a particular operating mode (e.g., without user input). Additionally, or alternatively, the operating mode of the vehicle 212 can be manually selected through one or more interfaces located onboard the vehicle 212 (e.g., key switch, button, etc.) or associated with a computing device within a certain distance to the vehicle 212 (e.g., a tablet operated by authorized personnel located near the vehicle 212 and connected by wire or within a wireless communication range). In some implementations, the operating mode of the vehicle 212 can be adjusted by manipulating a series of interfaces in a particular order to cause the vehicle 212 to enter into a particular operating mode.

The operations computing system 290A can include multiple components for performing various operations and functions. For example, the operations computing system 290A can be configured to monitor and communicate with the vehicle 212 or its users to coordinate a vehicle service provided by the vehicle 212. To do so, the operations computing system 290A can communicate with the one or more remote computing system(s) 290B or the vehicle 212 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 212.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 212 including sending or receiving data or signals to or from the vehicle 212, monitoring the state of the vehicle 212, or controlling the vehicle 212. The one or more remote computing system(s) 290B can communicate (e.g., exchange data or signals) with one or more devices including the operations computing system 290A and the vehicle 212 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 214), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 212 including a location (e.g., a latitude and longitude), a velocity, an acceleration, a trajectory, a heading, or a path of the vehicle 212 based in part on signals or data exchanged with the vehicle 212. In some implementations, the operations computing system 290A can include the one or more remote computing system(s) 290B.

The vehicle computing system 214 can include one or more computing devices located onboard the vehicle 212. For example, the computing device(s) can be located on or within the vehicle 212. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 212 (e.g., its computing system, one or more processors, etc.) to perform operations and functions, such as those described herein for collecting training data, communicating with other computing systems, etc.

The vehicle 212 can include a communications system 215 configured to allow the vehicle computing system 214 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 214 can use the communications system 215 to communicate with one or more computing device(s) that are remote from the vehicle 212 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 212 or among computing systems.

As shown in FIG. 2B, the vehicle computing system 214 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 206, etc.) and at least one second sensor (e.g., the second sensor(s) 208, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain object data, traffic element data, or multi-modal sensor data indicative of one or more static or dynamic objects within an environment of the vehicle 212. As described herein with reference to the remaining figures, the sensor data can be provided to the operational computing system 290A for use in training one or more machine-learned optimization algorithms described in FIGS. 1A-E.

The sensor(s) 235 can be configured to acquire sensor data 255. The sensor(s) 235 can be external sensors configured to acquire external sensor data. This can include sensor data associated with the surrounding environment of the vehicle 212. The surrounding environment of the vehicle 212 can include/be represented in the field of view of the sensor(s) 235. For instance, the sensor(s) 235 can acquire image or other data of the environment outside of the vehicle 212 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 212 including a front side, rear side, left side, right side, top, or bottom of the vehicle 212. The sensor data 255 can include image data (e.g., 2D camera data, video data, etc.), RADAR data, LIDAR data (e.g., 3D point cloud data, etc.), audio data, or other types of data. The vehicle 212 can also include other sensors configured to acquire data associated with the vehicle 212. For example, the vehicle 212 can include inertial measurement unit(s), wheel odometry devices, or other sensors.

In some instances, the optimization algorithm can obtain sensor data 255, map data 260, and positioning system 265 to determine the values for the cost dimensions of the cost function described in FIGS. 1A-1F.

The sensor data 255 can be indicative of one or more objects within the surrounding environment of the vehicle 212. The object(s) can include, for example, vehicles, pedestrians, bicycles, or other objects. The object(s) can be located in front of, to the rear of, to the side of, above, below the vehicle 212, etc. The sensor data 255 can be indicative of locations associated with the object(s) within the surrounding environment of the vehicle 212 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 212 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 214 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 212 (or autonomous vehicles generally) can travel (e.g., due to legal/regulatory constraints, autonomy capabilities, or other factors).

The vehicle 212 can include a positioning system 265. The positioning system 265 can determine a current position of the vehicle 212. This can help the vehicle 212 localize itself within its environment. The positioning system 265 can be any device or circuitry for analyzing the position of the vehicle 212. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. The position of the vehicle 212 can be used by various systems of the vehicle computing system 214 or provided to a remote computing system. For example, the map data 260 can provide the vehicle 212 relative positions of the elements of a surrounding environment of the vehicle 212. The vehicle 212 can identify its position within the surrounding environment (e.g., across six axes, etc.) based at least in part on the map data 260. For example, the vehicle computing system 214 can process the sensor data 255 (e.g., object data, traffic element data, LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 212. For example, the autonomy computing system 240 can perform functions associated with the following systems: a perception system 270A, a prediction system 270B, a motion planning system 270C, and an optimization algorithm 270D. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, optimization algorithm or other systems that cooperate to perceive the surrounding environment of the vehicle 212 and determine a motion plan for controlling the motion of the vehicle 212 accordingly. In some implementations, one or more of the perception system 270A, the prediction system 270B, the motion planning system 270C, or optimization algorithm 270D can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 212 according to the motion plan (e.g., through the vehicle interface 245, etc.).

The vehicle computing system 214 (e.g., the autonomy computing system 240) can identify one or more objects that are within the surrounding environment of the vehicle 212 based at least in part on the sensor data 255 or the map data 260. The demonstration data 275D can be determined based on the obtained sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 214 (e.g., performing perception functions, using a perception system 270A, etc.) can process the sensor data 255, the map data 260, etc. to obtain perception data 275A. The vehicle computing system 214 can generate perception data 275A that is indicative of one or more states (e.g., current, or past state(s)) of one or more objects that are within a surrounding environment of the vehicle 212. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information.

The vehicle computing system 214 can generate demonstration data 275D when the vehicle is being driven by a human. In some instances, the demonstration data 275D can be determined based on perception data 275A.

The vehicle computing system 214 can utilize one or more algorithms or machine-learned model(s), such as the optimization algorithm 270D, that are configured to identify object(s) based at least in part on the sensor data 255. This can include, for example, one or more neural networks trained to identify object(s) within the surrounding environment of the vehicle 212 and the state data associated therewith. The perception data 275A can be utilized for functions of the prediction system 270B of the autonomy computing system 240.

The vehicle computing system 214 can be configured to predict a motion of the object(s) within the surrounding environment of the vehicle 212. For instance, the vehicle computing system 214 can generate prediction data 275B associated with such object(s). The prediction data 275B can be indicative of one or more predicted future locations of each respective object. For example, the prediction system 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 214 can utilize one or more algorithms or machine-learned model(s), such as the optimization algorithm 270D, that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 212 based at least in part on the past or current state(s) of those objects as well as the environment in which the objects are located (e.g., the lane boundary in which it is traveling). The prediction data 275B can be utilized for the motion planning functions of motion planning system 270C of the autonomy computing system 240.

The vehicle computing system 214 can determine a motion plan for the vehicle 212 based at least in part on the perception data 275A, the prediction data 275B, or other data. The optimization algorithm 270D can improve the performance of the vehicle by determining an optimal motion plan that can outperform all human demonstration. For example, the vehicle computing system 214 can generate motion plan data 275C indicative of a motion plan. The motion plan data 275C can be optimized (e.g., improved) using the optimization algorithm 270D and the techniques described in FIGS. 1A-E and FIGS. 3-6.

The motion plan data 275C can include a motion plan for different driving scenarios. The motion plan data 275C can include vehicle actions (e.g., speed(s), acceleration(s), other actions, etc.) with respect to one or more of the objects within the surrounding environment of the vehicle 212 as well as the objects' predicted movements. The motion plan can include one or more vehicle motion trajectories that indicate a path for the vehicle 212 to follow. A vehicle motion trajectory can be of a certain length or time range. A vehicle motion trajectory can be defined by one or more way points (with associated coordinates). The planned vehicle motion trajectories can indicate the path the vehicle 212 is to follow as it traverses a route from one location to another. Thus, the vehicle computing system 214 can consider a route/route data when performing the motion planning function of motion planning system 270C. The motion plan data 275C can be an example of the AV plan described in FIGS. 1A-1F and FIGS. 3-6.

The vehicle computing system 214 can implement a machine-learned model (e.g., optimization algorithm 270D) that considers cost data associated with a vehicle action as well as other objective functions (e.g., cost functions based on speed limits, traffic lights, etc.), if any, to determine optimized variables that make up the motion plan. The vehicle computing system 214 can determine that the vehicle 212 can perform a certain action (e.g., pass an object, etc.) without increasing the potential risk to the vehicle 212 or violating any traffic laws (e.g., speed limits, lane boundaries, signage, etc.). For instance, the vehicle computing system 214 can evaluate the predicted motion trajectories of one or more objects during its cost data analysis to help determine an optimized vehicle trajectory through the surrounding environment. The optimization algorithm 270D can generate cost data associated with such trajectories. In some implementations, one or more of the predicted motion trajectories or perceived objects may not ultimately change the motion of the vehicle 212 (e.g., due to an overriding factor). In some implementations, the motion plan can define the vehicle's motion such that the vehicle 212 avoids the object(s), reduces speed to give more leeway to one or more of the object(s), proceeds cautiously, performs a stopping action, passes an object, queues behind/in front of an object, etc.

The vehicle computing system 214 can be configured to continuously update, based on the optimization algorithm 270D, the vehicle's motion plan and corresponding planned vehicle motion trajectories. For example, in some implementations, the vehicle computing system 214 can generate new motion plan data 275C/motion plan(s) for the vehicle 212 (e.g., multiple times per second, etc.). Each new motion plan can describe a motion of the vehicle 212 over the next planning period (e.g., next several seconds, etc.). Moreover, a new motion plan can include a new planned vehicle motion trajectory. Thus, in some implementations, the vehicle computing system 214 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 212.

The vehicle computing system 214 can cause the vehicle 212 to initiate a motion control in accordance with at least a portion of the motion plan data 275C. A motion control can be an operation, action, etc. that is associated with controlling the motion of the vehicle 212. For instance, the motion plan data 275C can be provided to the vehicle control system(s) 250 of the vehicle 212. The vehicle control system(s) 250 can be associated with a vehicle interface 245 that is configured to implement a motion plan (e.g., based on a predicted trajectory of an object). The vehicle interface 245 can serve as an interface/conduit between the autonomy computing system 240 and the vehicle control systems 250 of the vehicle 212 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 212 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 212 to autonomously travel within the vehicle's surrounding environment.

The vehicle computing system 214 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 212. Additionally, the vehicle 212 can communicate data indicative of the state of the vehicle, the state of one or more passengers of the vehicle, or the state of an environment to a computing system that is remote from the vehicle 212, which can store such information in one or more memories remote from the vehicle 212. Moreover, the vehicle 212 can provide any of the data created or store onboard the vehicle 212 to another vehicle.

The vehicle computing system 214 can include the one or more vehicle user devices 280. For example, the vehicle computing system 214 can include one or more user devices with one or more display devices located onboard the vehicle 212. A display device (e.g., screen of a tablet, laptop, or smartphone) can be viewable by a user of the vehicle 212 that is located in the front of the vehicle 212 (e.g., driver's seat, front passenger seat). Additionally, or alternatively, a display device can be viewable by a user of the vehicle 212 that is located in the rear of the vehicle 212 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 214 or another computing system (e.g., a remote computing system, etc.). For example, a user (e.g., a passenger for transportation service, a vehicle operator, etc.) of the vehicle 212 can provide user input to adjust a destination location of the vehicle 212. The vehicle computing system 214 or another computing system can update the destination location of the vehicle 212 and the route associated therewith to reflect the change indicated by the user input.

As described herein, with reference to the remaining figures, the autonomy computing system 240 can utilize one or more machine-learned models (e.g., optimization algorithm 270D) to perform the functions of perception system 270A, prediction system 270B, or motion planning system 270C. The machine-learned model(s) can be previously trained through one or more machine-learned techniques described herein.

The optimization algorithm 270D can be previously trained by the one or more remote computing system(s) 290B, the operations computing system 290A, or any other device (e.g., remote servers, training computing systems, etc.) remote from or onboard the vehicle 212. For example, the optimization algorithm 270D can be learned by a training computing system (e.g., the operations computing system 290A, etc.) over training data stored in a training database. The training data can include sequential multi-modal sensor data indicative of a plurality of environments at different time steps. In some implementations, the training data can include human demonstration data 275D, object data, traffic element data, and implementation plan associated with a trajectory of an object.

Figure 3:
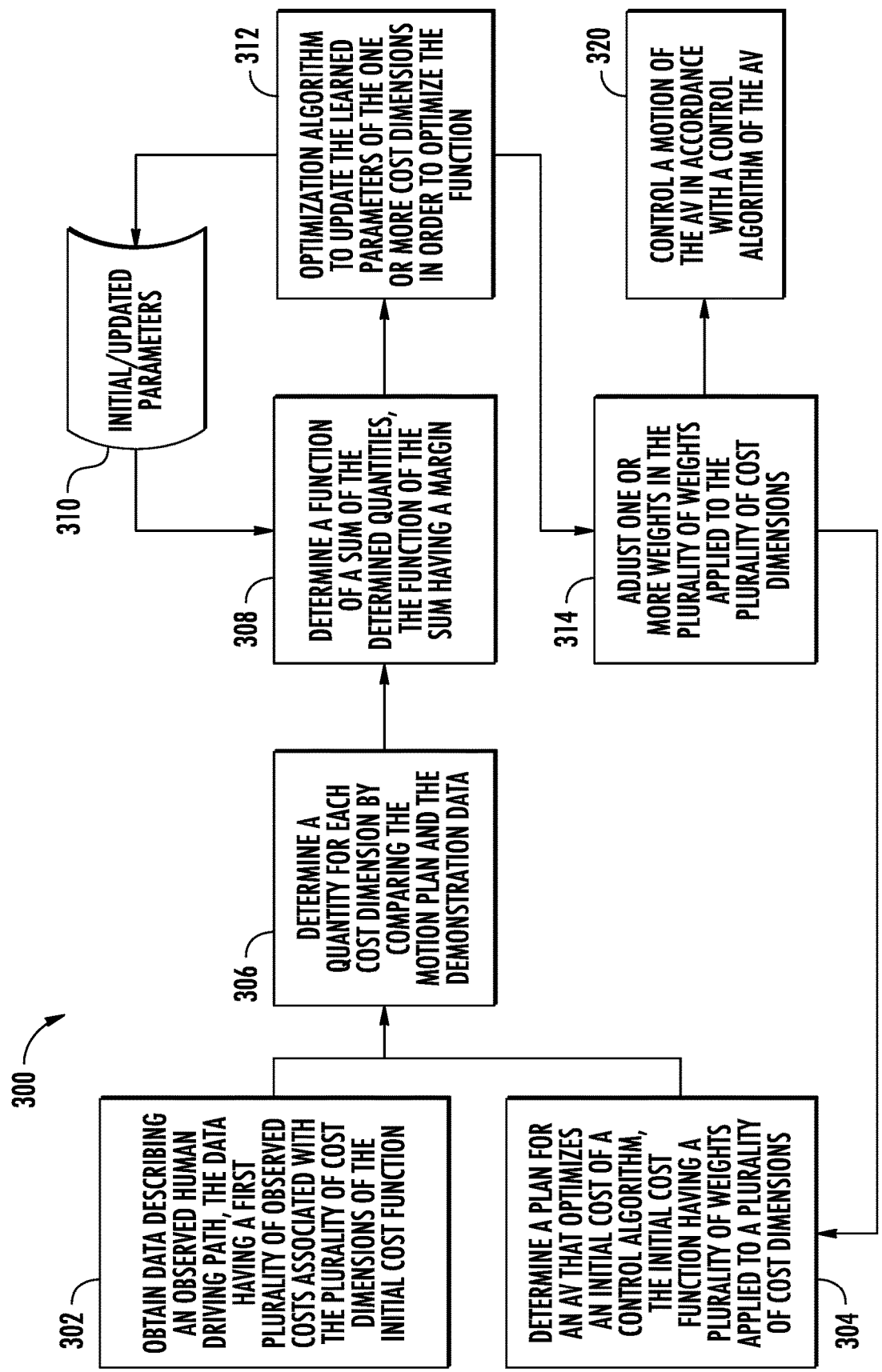
FIG. 3 is a machine-learning optimization flow chart of a method to improve performance of an autonomous vehicle, according to some implementations of the present disclosure.

FIG. 3 is a machine-learning optimization flow chart of a method 300 to improve performance of an autonomous vehicle, according to some implementations of the present disclosure. In some instances, the method 300 is implemented using an optimization algorithm 312. The optimization algorithm 270D in FIG. 2B is an example of the optimization algorithm 312 in FIG. 3. The method 300 can be implemented by any of the system(s) (e.g., robotic platform 202, vehicle 212, vehicle computing system 214, remote computing system 290B, operations computing system 290A, etc.) described herein such as, for example, with reference to FIGS. 1A-E, 2A-B, etc. The method 300 can be implemented to optimize an initial cost function of a control algorithm of the AV.

According to some embodiments, at 302, the method 300 can include obtaining demonstration data describing an observed human driving path in a driving scenario. The data can include a first plurality of observed costs associated with a plurality of cost dimensions of an initial cost function. The cost dimensions can include any of the cost dimensions (e.g., $m_1$ 104, $m_2$ 106) described herein such as, for example, with reference to FIGS. 1A-E. The data obtained at 302 can include any of the demonstration data (e.g., data associated with demonstration 130 and/or demonstration 153)

described herein such as, for example, with reference to FIGS. 1A-E. Additionally, the data obtained at 302 can include demonstration data 275D in FIG. 2B.

At 304, the method 300 can include determining a plan for an AV in the driving scenario that optimizes the initial cost function. The initial cost function may include a plurality of cost dimensions and a plurality of weights applied to the plurality of cost dimensions. The plan determined at 304 can include any of the AV plans (e.g., AV plan 108, AV plan 122, AV plan 145, AV plan 162) described herein such as, for example, with reference to FIGS. 1A-D.

At 306, the method 300 can include determining a quantity for each cost dimension by comparing the motion plan determined at 304 and the demonstration data obtained at 302. The quantity compares the estimated cost to the observed cost of the observed human driving path. For example, the cost of the demonstration can be subtracted from the cost of the motion pan for each cost dimension. Alternatively, the cost of the motion plan can be subtracted from the cost of the demonstration for each cost dimension.

At 308, the method 300 can include determining a function of a sum of the quantities determined at 306. The function can include parameters 310. The parameters 310 can be fixed parameters that are initially determined or learned parameters that can be updated during iterations of the method 300. For example, the parameters can include a fixed margin and a learned margin slope as described previously herein. In some instances, the method 300 can include determining the function of a sum of the quantities using Equation 3, Equation 4, or Equation 5. The output of the function can be referred to as the margin-augmented sub-dominance of the demonstration with respect to the motion plan.

At 312, the method 300 can include using an optimization algorithm to update the learned parameters of the one or more cost dimensions in order to optimize the function (e.g., minimize the output of the function) determined at 308. The optimization algorithm 270D in FIG. 2B and the optimization algorithm described in Equation 7 are examples of the optimization algorithm 312 in FIG. 3. Additionally, the optimization algorithm 312 described in reference to method 300 can include any of the optimization algorithms described herein such as, for example, with reference to FIGS. 1A-E.

The updated learned parameters can be used to again compute the output of the function at 308. This process can be repeated until the output of the function is minimized or otherwise optimized, or until convergence is reached.

At 314, the method 300 can include using an optimization algorithm to adjust one or more weights of the plurality of weights applied to the plurality of cost dimensions to reduce the output of the function (i.e., reduce the margin-augmented subdominance). In some instances, the optimization algorithm can use or rely on Equation 8 to update the weights to optimize the function of the sum of the quantities.

At 320, the method 300 can include controlling a motion of the AV in accordance with a control algorithm of the AV using the optimal plan.

Figure 4:
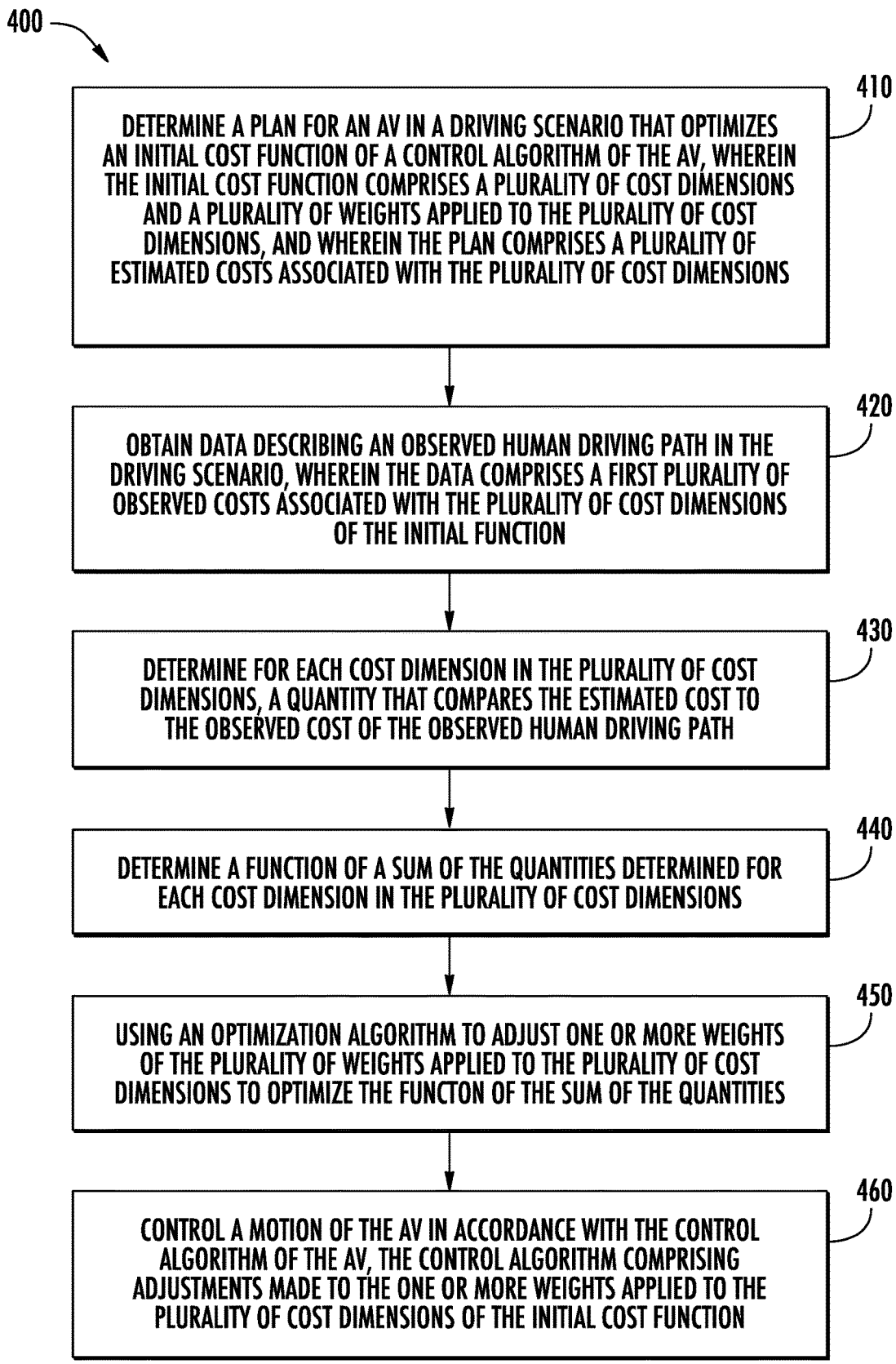
FIG. 4 is a flowchart of a method for improving performance of an autonomous vehicle by optimizing subdominance, according to aspects of the present disclosure.

FIG. 4 depicts a flowchart of a method 400 for improving performance of an autonomous vehicle by optimizing sub-dominance, according to aspects of the present disclosure. One or more portion(s) of the method 400 can be implemented by a computing system that includes one or more computing devices such as, for example, the computing systems described with reference to the other figures (e.g., optimization algorithm 270D, optimization algorithm 312, robotic platform 202, vehicle computing system 214, operations computing system(s) 290A, remote computing system(s) 290B, system 300). Each respective portion of the method 400 can be performed by any (or any combination) of one or more computing devices. Moreover, one or more portion(s) of the method 400 can be implemented as an algorithm on the hardware components of the device(s) described herein (e.g., FIGS. 1A-3, 6), for example, to train a machine-learning model (e.g., optimization algorithm 270D, optimization algorithm 312) or to generate an optimal plan as described at 320 in FIG. 3.

FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of method 400 can be performed additionally, or alternatively, by other systems.

At 410, a computing system determines a plan for the AV in a driving scenario that optimizes an initial cost function of a control algorithm of the AV. The initial cost function comprises a plurality of cost dimensions and a plurality of weights applied to the plurality of cost dimensions. Additionally, the plan comprises a plurality of estimated costs associated with the plurality of cost dimensions. In some instances, the computing system can be the robotic platform 202, vehicle computing system 214, operations computing system(s) 290A, remote computing system(s) 290B, and/or system 300.

In some implementations, the plurality of cost dimensions includes a control cost, nudge lateral cost, or a lateral jerk cost. Examples of cost dimensions of a cost function are related to costs that are associated with: the distance of the AV to another vehicle; the speed of the AV in relation to the speed limit; the location of the AV in relation to the lane boundaries; change in acceleration; the amount of brake pressure applied, jerkiness of the AV, and so on. As previously mentioned, it can be difficult to mutually balance criteria such as the AV not being too close to the vehicle in front and also minimizing the jerkiness of the AV. The optimization algorithm, using the techniques described herein, can determine an optimal balance between the different cost dimensions of the cost function to generate an optimal AV plan that outperforms the human demonstrations.

At 420, the computing system obtains data describing an observed human driving path in the driving scenario. The data comprises a first plurality of observed costs associated with the plurality of cost dimensions of the initial cost function.

At 430, the computing system determines, for each cost dimension in the plurality of cost dimensions, a quantity that compares the estimated cost to the observed cost of the observed human driving path.

At 440, the computing system determines a function of a sum of the quantities determined for each cost dimension in the plurality of cost dimensions. In some implementations, the function can have parameters, including fixed parameters and learned parameters. In some implementations, the fixed and/or learned parameters can include, for example, a margin by which the estimated cost for each cost dimension in the plurality of cost dimensions exceeds the observed cost of the observed human driving path. In some implementations, the fixed and/or learned parameters can include, for example a margin slope.

In some implementations, the function of the sum of the quantities is a total sum of the quantities determined for each cost dimension in the plurality of cost dimensions.

At 450, the computing system uses an optimization algorithm to adjust one or more weights of the plurality of weights applied to the plurality of cost dimensions to optimize the function of the sum of the quantities. In some implementations, the one or more weights of the plurality of weights is adjusted to minimize the function of the sum of quantities. In some implementations, the function of the sum of the quantities is optimized when the function of the sum of the quantities achieves a global minimum for all of the plurality of weights applied to the plurality of cost dimensions.

In some implementations, the function includes a plurality of learned parameters associated with the plurality of cost dimensions. The method 400 can further include, prior to operations at 450, updating, using the optimization algorithm, the plurality of learned parameters to optimize an output of the function. Additionally, the operation at 450 can include adjusting the one or weights based at least in part on the updated plurality of learned parameters.

In some implementations, the optimization algorithm (e.g., optimization algorithm 312, optimization algorithm 270D) includes a machine-learned model that is trained based on the data describing the observed human driving path (e.g., demonstration 130, demonstration 132 in FIG. 1B) in the driving scenario.

In some implementations, method 400 further include updating, using the optimization algorithm, a respective margin slope for one or more cost dimensions in the plurality of cost dimensions based on the adjusted one or more weights of the plurality of weights applied to the plurality of cost dimensions.

In some implementations, the data obtained at 420 further includes a second plurality of observed costs associated with the plurality of cost dimensions of the initial cost function. The method 400 can further include determining the observed cost of the observed human driving path by averaging, for each cost dimension in the plurality of cost dimensions, the first plurality of observed costs with the second plurality of observed costs.

In some implementations, the function of the sum of the quantities determined at 440 includes a respective margin slope for each cost dimension in the plurality of cost dimensions. The method 400 can further include setting a value of the respective margin slope for each cost dimension in the plurality of cost dimensions based on the plan for the AV. Additionally, the optimization algorithm utilized at 450 can adjust the one or more weights in the plurality of weights based on the respective margin slopes.

In some implementations, the determined plan for the AV includes a human-behavior prediction portion and an AV-behavior prediction portion. Additionally, the method 400 can include generating a first sparse plan distribution based on the human-behavior prediction portion of the determined plan. Moreover, the method 400 can further include generating a second sparce plan distribution based on the AV-behavior prediction portion.

Figure 5:
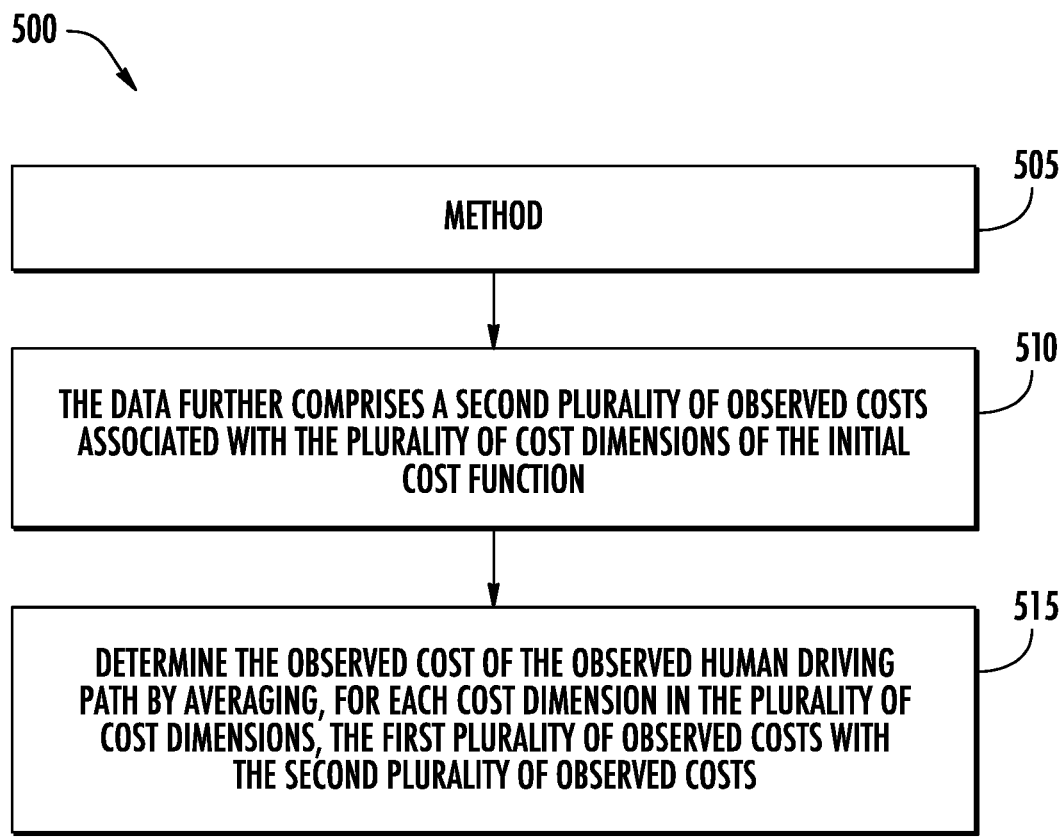
FIG. 5 is a flowchart of a method for optimizing subdominance using robust Pareto dominance, according to aspects of the present disclosure.

The method 400 can be further modified by one or more portion(s) of method 500 in FIG. 5. For example, one or more portions of method 600 can be performed in addition to the method 400. FIG. 5 depicts a flowchart of a method 500 for optimizing subdominance using robust Pareto dominance, according to aspects of the present disclosure. One or more portion(s) of the method 500 can be implemented by a computing system that includes one or more computing devices such as, for example, the computing systems described with reference to the other figures (e.g., optimization algorithm 270D, optimization algorithm 312, robotic platform 202, vehicle computing system 214, operations computing system(s) 290A, remote computing system(s) 290B, system 300). Each respective portion of the method 500 can be performed by any (or any combination) of one or more computing devices. Moreover, one or more portion(s) of the method 500 can be implemented as an algorithm on the hardware components of the device(s) described herein (e.g., FIGS. 1A-3, 6). Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

In some instances, the techniques described in FIG. 1E can be used to perform method 500.

At 505, a computing system performs the techniques described in method 400.

At 510, the data obtained in method 400 can further include a second plurality of observed costs associated with the plurality of cost dimensions of the initial cost function.

At 515, the computing system determines the observed cost of the observed human driving path by averaging, for each cost dimension in the plurality of cost dimensions, the first plurality of observed costs with the second plurality of observed costs.

Figure 6:
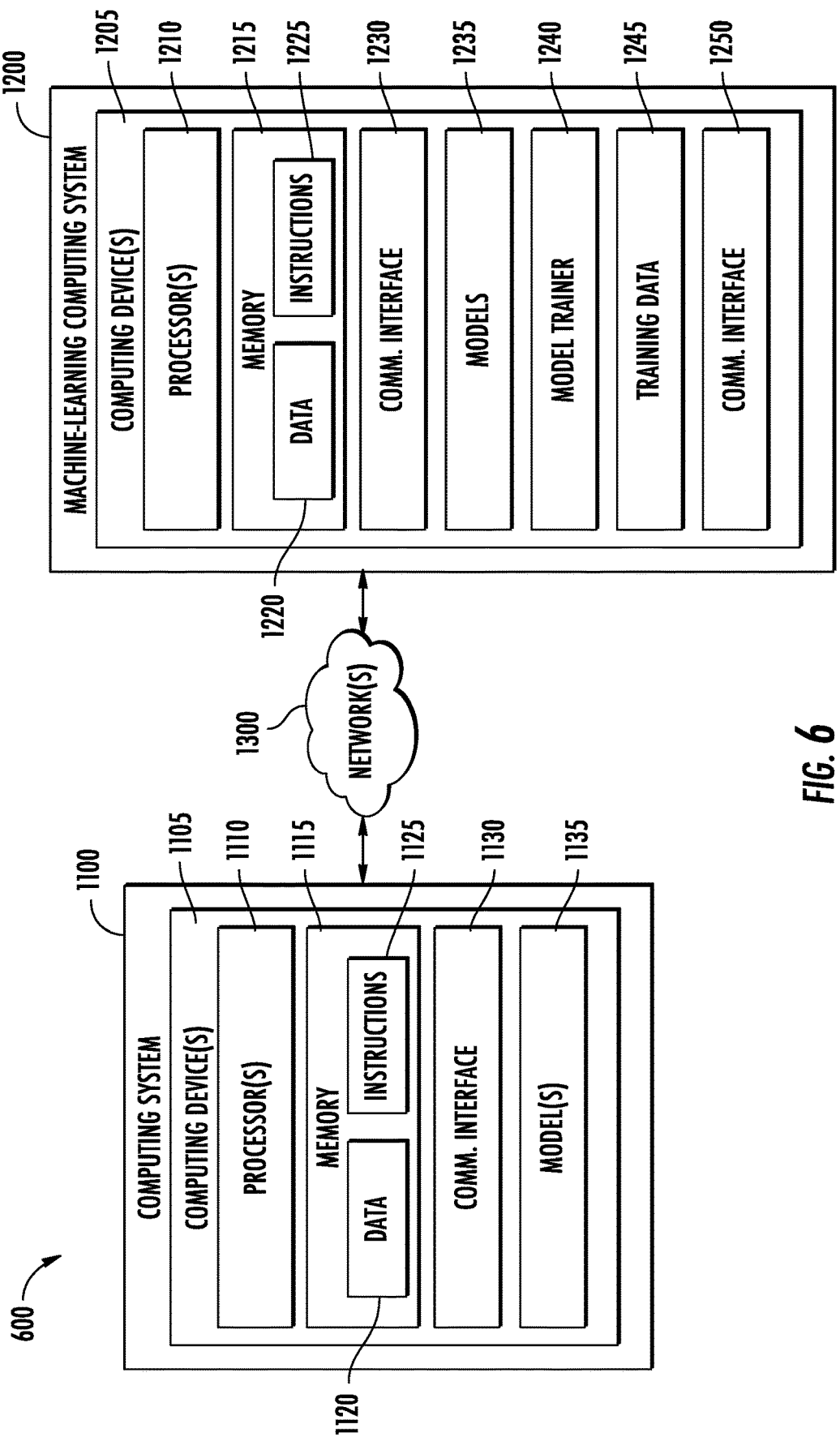
FIG. 6 is a block diagram of a computing system, according to some implementations of the present disclosure.

FIG. 6 depicts a block diagram of an example computing system 600 according to example embodiments of the present disclosure. The example computing system 600 includes a computing system 1100 and a machine learning computing system 1200 that are communicatively coupled over one or more networks 1300.

In some implementations, the computing system 1100 can perform one or more observation tasks such as, for example, by obtaining sensor data (e.g., object data, traffic data, multi-modal sensor data) associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, object data, traffic element data, hybrid graph data, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate a hybrid graph, predict an interaction between two objects, predict a trajectory of an object, implement a motion plan, update the interaction prediction model, update the graph neural network model, and so on.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to generate a hybrid graph, predict an interaction between two objects, predict a trajectory of an object, implement a motion plan, update the interaction prediction model, update the graph neural network model, and so on.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, object data, traffic element data, hybrid graph data, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, training a machine-learned object removal model, generating simulation data, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, object data, traffic element data, hybrid graph data, data associated with the interaction prediction model, data associated with the graph neural network data, labeled sequential multi-modal sensor data indicative of a plurality of environments at different timesteps, and so on. In some implementations, the training data can include a plurality of environments previously recorded by the autonomous vehicle with dynamic objects removed. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software, or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 6 illustrates one example computing system 600 that can be used to implement the present disclosure. Other computing systems can be used as well. For example, in some implementations, the computing system 1100 can include the model trainer 1240 and the training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

What is claimed is:

1. A method for improving performance of an autonomous vehicle (AV), the method comprising:
   (a) determining a plan for the AV in a driving scenario that optimizes an initial cost function of a control algorithm of the AV, wherein the initial cost function comprises a plurality of cost dimensions and a plurality of weights applied to the plurality of cost dimensions, and wherein the plan comprises a plurality of estimated costs associated with the plurality of cost dimensions;
(b) obtaining data describing an observed human driving path in the driving scenario, wherein the data comprises a first plurality of observed costs associated with the plurality of cost dimensions of the initial cost function;
(c) determining, for each cost dimension in the plurality of cost dimensions, a quantity by which the estimated cost exceeds the observed cost of the observed human driving path;
(d) determining a function of a sum of the quantities determined for each cost dimension in the plurality of cost dimensions, wherein the function of the sum of the quantities comprises a margin by which the estimated cost for each cost dimension in the plurality of cost dimensions exceeds the observed cost of the observed human driving path;
(e) using an optimization algorithm to adjust one or more weights of the plurality of weights applied to the plurality of cost dimensions to optimize the function of the sum of the quantities; and
(f) controlling a motion of the AV in accordance with the control algorithm of the AV. the control algorithm comprising adjustments made to the one or more weights applied to the plurality of cost dimensions of the initial cost function.

2. The method of claim 1, wherein the margin is indicative of an expected dominance gap between the estimated cost and the observed cost.

3. The method of claim 1, wherein the function comprises a plurality of learned parameters associated with the plurality of cost dimensions, and wherein the method further comprises, prior to (e), updating, using the optimization algorithm, the plurality of learned parameters to optimize an output of the function.

4. The method of claim 3, wherein (e) comprises adjusting the one or more weights based at least in part on the updated plurality of learned parameters.

5. The method of claim 1, wherein the function of the sum of the quantities comprises a respective margin slope for each cost dimension in the plurality of cost dimensions, and wherein the method further comprises:
setting a value of the respective margin slope for each cost dimension in the plurality of cost dimensions based on the plan for the AV, and wherein (e) comprises adjusting the one or more weights in the plurality of weights based on the respective margin slopes.

6. The method of claim 1, wherein the one or more weights of the plurality of weights is adjusted to minimize the function of the sum of quantities.

7. The method of claim 1, wherein the function of the sum of the quantities is optimized when the function of the sum of the quantities achieves a global minimum for all of the plurality of weights applied to the plurality of cost dimensions.

8. The method of claim 1, wherein the function of the sum of the quantities is a total sum of the quantities determined for each cost dimension in the plurality of cost dimensions.

9. The method of claim 1, wherein the plurality of cost dimensions includes a control cost, nudge lateral cost, and a lateral jerk cost.

10. The method of claim 1, wherein the optimization algorithm comprises a machine-learned model that is trained based on the data describing the observed human driving path in the driving scenario.

11. The method of claim 1, wherein the data further comprises a second plurality of observed costs associated with the plurality of cost dimensions of the initial cost function; and
the method further comprises:
determining the observed cost of the observed human driving path by averaging, for each cost dimension in the plurality of cost dimensions, the first plurality of observed costs with the second plurality of observed costs.

12. The method of claim 1, wherein the determined plan for the AV includes a human-behavior prediction portion and an AV-behavior prediction portion.

13. The method of claim 12, the method further comprising:
generating a first sparse plan distribution based on the human-behavior prediction portion of the determined plan; and
generating a second sparce plan distribution based on the AV-behavior prediction portion.

14. An autonomous vehicle control system for an autonomous vehicle (AV), the autonomous vehicle control system comprising:
one or more processors;
one or more non-transitory computer-readable media that store an optimization algorithm, wherein the optimization algorithm is configured to optimize an initial cost function of a control algorithm of an AV, wherein the initial cost function comprises a plurality of cost dimensions and a plurality of weights applied to the plurality of cost dimensions; and
instructions that, when executed by the one or more processors, cause the autonomous vehicle control system to perform operations, the operations comprising:
determining a plan for the AV in a driving scenario that optimizes the initial cost function of the control algorithm of the AV, wherein the plan comprises a plurality of estimated costs associated with the plurality of cost dimensions;
obtaining data describing an observed human driving path in the driving scenario, wherein the data comprises a plurality of observed costs associated with the plurality of cost dimensions of the initial cost function;
determining for each cost dimension in the plurality of cost dimensions, a quantity by which the estimated cost exceeds the observed cost of the observed human driving path;
determining, a function of a sum of the quantities determined for each cost dimension in plurality of cost dimensions, wherein the function of the sum of the quantities comprises a margin by which the estimated cost for each cost dimension in the plurality of cost dimensions exceeds the observed cost of the observed human driving path;
using the optimization algorithm to adjust one or more weights of the plurality of weights applied to the plurality of cost dimensions to optimize the function of the sum of the quantities; and
controlling a motion of the AV in accordance with the control algorithm of the AV, the control algorithm comprising adjustments made to the one or more weights applied to the plurality of cost dimensions of the initial cost function.

15. The autonomous vehicle control system of claim 14, wherein the estimated cost for each cost dimension in the plurality of cost dimensions exceeds the observed cost of the observed human driving path by at least a margin, the operations further comprising:

updating, using the optimization algorithm, the margin based on the adjusted one or more weights of the plurality of weights applied to the plurality of cost dimensions.

16. One or more non-transitory computer-readable media that store:

an optimization algorithm, wherein the optimization algorithm is configured to optimize an initial cost function of a control algorithm of an autonomous vehicle (AV), wherein the initial cost function comprises a plurality of cost dimensions and a plurality of weights applied to the plurality of cost dimensions; and instructions that, when executed by one or more processors, cause an autonomous vehicle control system to perform operations, the operations comprising:

determining a plan for the AV in a driving scenario that optimizes the initial cost function of the control algorithm of the AV, wherein the plan comprises a plurality of estimated costs associated with the plurality of cost dimensions, obtaining data describing an observed human driving path in the driving scenario, wherein the data comprises a plurality of observed costs associated with the plurality of cost dimensions of the initial cost function;

determining for each cost dimension in the plurality of cost dimensions, a quantity by which the estimated cost exceeds the observed cost of the observed human driving path;

determining, a function of a sum of the quantities determined for each cost dimension in plurality of cost dimensions, wherein the function of the sum of the quantities comprises a margin by which the estimated cost for each cost dimension in the plurality of cost dimensions exceeds the observed cost of the observed human driving path;

using the optimization algorithm to adjust one or more weights of the plurality of weights applied to the plurality of cost dimensions to optimize the function of the sum of the quantities; and controlling a motion of the AV in accordance with the control algorithm of the AV, the control algorithm comprising adjustments made to the one or more weights applied to the plurality of cost dimensions of the initial cost function.

* * * * *